United States Patent
Muramatsu

(10) Patent No.: US 11,251,427 B2
(45) Date of Patent: Feb. 15, 2022

(54) POSITIVE ACTIVE MATERIAL FOR NONAQUEOUS ELECTROLYTE SECONDARY BATTERY, TRANSITION METAL HYDROXIDE PRECURSOR, METHOD OF PRODUCING TRANSITION METAL HYDROXIDE PRECURSOR, METHOD OF PRODUCING POSITIVE ACTIVE MATERIAL FOR NONAQUEOUS ELECTROLYTE SECONDARY BATTERY, POSITIVE ELECTRODE FOR NONAQUEOUS ELECTROLYTE SECONDARY BATTERY, AND NONAQUEOUS ELECTROLYTE SECONDARY BATTERY

(71) Applicant: GS Yuasa International Ltd., Kyoto (JP)

(72) Inventor: Hiromasa Muramatsu, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 0 days.

(21) Appl. No.: 16/771,499

(22) PCT Filed: Dec. 14, 2018

(86) PCT No.: PCT/JP2018/046042
§ 371 (c)(1),
(2) Date: Jun. 10, 2020

(87) PCT Pub. No.: WO2019/117281
PCT Pub. Date: Jun. 20, 2019

(65) Prior Publication Data
US 2021/0075012 A1    Mar. 11, 2021

(30) Foreign Application Priority Data

Dec. 15, 2017 (JP) .............................. JP2017-240406
Dec. 15, 2017 (JP) .............................. JP2017-240407

(51) Int. Cl.
*H01M 4/525* (2010.01)
*H01M 4/04* (2006.01)
(Continued)

(52) U.S. Cl.
CPC ............ *H01M 4/525* (2013.01); *C01G 53/50* (2013.01); *H01M 4/0471* (2013.01);
(Continued)

(58) Field of Classification Search
CPC .................................................... H01M 4/525
See application file for complete search history.

(56) References Cited

U.S. PATENT DOCUMENTS

2004/0234857 A1    11/2004    Shiozaki et al.
2009/0104530 A1    4/2009     Shizuka et al.
(Continued)

FOREIGN PATENT DOCUMENTS

JP    2001-85006 A     3/2001
JP    2003-229124 A    8/2003
(Continued)

OTHER PUBLICATIONS

International Search Report (ISR) dated Mar. 19, 2019 issued in PCT/JP2018/046042.

*Primary Examiner* — Peter F Godenschwager
(74) *Attorney, Agent, or Firm* — Rankin, Hill & Clark LLP

(57) ABSTRACT

Disclosed is a positive active material for a nonaqueous electrolyte secondary battery containing a lithium transition metal composite oxide, in which the lithium transition metal composite oxide has an α-NaFeO$_2$ structure, a molar ratio Li/Me of Li and a transition metal (Me) is 1<Li/Me, Ni and Mn, or Ni, Co, and Mn are included as the transition metals (Me), a molar ratio Mn/Me of Mn and Me is 0.4≤Mn/Me<0.6, when the lithium transition metal composite oxide (Continued)

is pressed at a pressure of 40 MPa, a density is 2.7 g/cm$^3$ or more, the lithium transition metal composite oxide has an X-ray diffraction pattern attributable to R3-m.

4 Claims, 4 Drawing Sheets

(51) Int. Cl.
    *H01M 4/505*     (2010.01)
    *C01G 53/00*     (2006.01)
    *H01M 10/0525*   (2010.01)
    *H01M 4/02*      (2006.01)

(52) U.S. Cl.
    CPC ....... *H01M 4/505* (2013.01); *H01M 10/0525* (2013.01); *C01P 2002/72* (2013.01); *C01P 2006/10* (2013.01); *C01P 2006/40* (2013.01); *H01M 2004/028* (2013.01)

(56) References Cited

U.S. PATENT DOCUMENTS

| | | |
|---|---|---|
| 2010/0233542 A1 | 9/2010 | Endo et al. |
| 2011/0305955 A1 | 12/2011 | Song et al. |
| 2014/0004423 A1 | 1/2014 | Endo et al. |
| 2014/0038053 A1 | 2/2014 | Endo et al. |
| 2014/0234717 A1 | 8/2014 | Christensen et al. |
| 2015/0060725 A1 | 3/2015 | Yamamoto et al. |
| 2015/0221934 A1 | 8/2015 | Hiratsuka et al. |
| 2016/0028072 A1 | 1/2016 | Sakai et al. |
| 2016/0056462 A1 | 2/2016 | Sakai et al. |
| 2016/0099460 A1 | 4/2016 | Toyama et al. |
| 2017/0346071 A1 | 11/2017 | Ogata et al. |
| 2018/0145318 A1 | 5/2018 | Endo et al. |
| 2019/0020023 A1 | 1/2019 | Yokoyama et al. |

FOREIGN PATENT DOCUMENTS

| | | |
|---|---|---|
| JP | 2006-120529 A | 5/2006 |
| JP | 2008-13405 A | 1/2008 |
| JP | 2009-152114 A | 7/2009 |
| JP | 2010-278015 A | 12/2010 |
| JP | 2011-57518 A | 3/2011 |
| JP | 2011-113792 A | 6/2011 |
| JP | 2012-4109 A | 1/2012 |
| JP | 4877660 B2 | 2/2012 |
| JP | 2013-211239 A | 10/2013 |
| JP | 2014-29828 A | 2/2014 |
| JP | 2014-44928 A | 3/2014 |
| JP | 2014-44945 A | 3/2014 |
| JP | 2014-49410 A | 3/2014 |
| JP | 2014-67546 A | 4/2014 |
| JP | 2014-529868 A | 11/2014 |
| JP | 2015-164119 A | 9/2015 |
| JP | 2016-25041 A | 2/2016 |
| JP | 2016-54101 A | 4/2016 |
| JP | 2016-76470 A | 5/2016 |
| JP | 2016-143447 A | 8/2016 |
| JP | 2016-149258 A | 8/2016 |
| JP | 2017-84628 A | 5/2017 |
| WO | 2003/044881 A1 | 5/2003 |
| WO | 2014/192759 A1 | 12/2014 |
| WO | 2015/108163 A1 | 7/2015 |
| WO | 2016/151983 A1 | 9/2016 |
| WO | 2016/190419 A1 | 12/2016 |
| WO | 2018/012385 A1 | 1/2018 |

POSITIVE ACTIVE MATERIAL FOR NONAQUEOUS ELECTROLYTE SECONDARY BATTERY, TRANSITION METAL HYDROXIDE PRECURSOR, METHOD OF PRODUCING TRANSITION METAL HYDROXIDE PRECURSOR, METHOD OF PRODUCING POSITIVE ACTIVE MATERIAL FOR NONAQUEOUS ELECTROLYTE SECONDARY BATTERY, POSITIVE ELECTRODE FOR NONAQUEOUS ELECTROLYTE SECONDARY BATTERY, AND NONAQUEOUS ELECTROLYTE SECONDARY BATTERY

TECHNICAL FIELD

The present invention relates to a positive active material for a nonaqueous electrolyte secondary battery, a transition metal hydroxide precursor, a method of producing a transition metal hydroxide precursor, a method of producing a positive active material for a nonaqueous electrolyte secondary battery, a positive electrode for a nonaqueous electrolyte secondary battery, and a nonaqueous electrolyte secondary battery.

BACKGROUND ART

Heretofore, as a positive active material for a nonaqueous electrolyte secondary battery represented by a lithium secondary battery, a "LiMeO$_2$-type" active material (wherein Me is a transition metal) having an α-NaFeO$_2$-type crystal structure has been examined, and lithium secondary batteries including LiCoO$_2$ have been widely put to practical use. However, the discharge capacity of LiCoO$_2$ is about 120 to 130 mAh/g. As the Me, it has been desired to use Mn that is abundant as an earth resource. However, in the "LiMeO$_2$-type" active material containing Mn as Me, there is the problem that when the molar ratio Mn/Me of Mn in Me is more than 0.5, the structure is changed to a spinel type-structure by charge, and thus it is unable to maintain a crystal structure, resulting in very poor charge-discharge cycle performance.

In view of this, various "LiMeO$_2$-type" active materials which are excellent in charge-discharge cycle performance and in which the molar ratio Mn/Me of Mn in Me is 0.5 or less have been proposed, and some of them have been put to practical use. For example, a positive active material containing LiNi$_{1/2}$Mn$_{1/2}$O$_2$ or LiNi$_{1/3}$Co$_{1/3}$Mn$_{1/3}$O$_2$ as a lithium transition metal composite oxide has a discharge capacity of 150 to 180 mAh/g.

On the other hand, for the so-called "LiMeO$_2$-type" active material as described above, the so-called "lithium excess type" active material in which a compositional ratio Li/Me of lithium (Li) to a transition metal (Me) is more than 1 and which contains a lithium transition metal composite oxide represented by a compositional formula Li$_{1+α}$Me$_{1-α}$O$_2$ (α>0) is known. It is also known to produce the lithium transition metal composite oxide from a hydroxide precursor (see, for example, Patent Documents 1 to 3).

Patent Document 1 discloses "A lithium transition metal composite oxide having an α-NaFeO$_2$-type crystal structure and represented by the composition formula of Li$_{1+α}$Me$_{1-α}$O$_2$ (Me is a transition metal including Co, Ni and Mn and α>0)" (Claim 1) and "A method for production of the positive active material for a lithium secondary battery according to claim 1 or 2, wherein a precursor for synthesis of the lithium transition metal composite oxide is a hydroxide of a transition metal including Co, Ni and Mn" (Claim 3).

Patent Document 1 further describes that "pH in the step of producing a precursor by coprecipitating in a solution a compound containing Co, Ni and Mn is not limited, but can be set at 10.5 to 14 when the coprecipitation precursor is produced as a coprecipitation hydroxide precursor. It is preferable to control pH for increasing the tap density. By setting pH at 11.5 or less, it can be ensured that the tap density is 1.00 g/cm$^3$ or more, so that high-rate discharge performance can be improved. Further, by setting pH at 11.0 or less, the particle growth rate can be accelerated, so that the stirring duration after completion of dropwise addition of a raw material aqueous solution can be reduced". (paragraph [0032]).

Patent Document 1 furthermore describes that in an initial charge-discharge step applied to a lithium secondary battery containing a positive active material according to Example, "Charge was constant current-constant voltage charge with a current of 0.1 CA and a voltage of 4.6 V" (paragraph [0098]).

Patent Document 2 discloses "A positive active material for a nonaqueous electrolyte secondary battery, comprising a lithium transition metal composite oxide, wherein a molar ratio (Li/Me) of Li and a transition metal (Me) that form the lithium transition metal composite oxide is more than 1, the transition metal (Me) includes Mn, Ni and Co, the lithium transition metal composite oxide has an α-NaFeO$_2$-type crystal structure, an X-ray diffraction pattern attributable to a space group R3-m, and a half-value width (FWHM (104)) for the diffraction peak of the (104) plane at a Miller index hkl in X-ray diffraction measurement using a CuKα ray of 0.21° or more and 0.55° or less, a ratio (FWHM (003)/FWHM (104)) of a half-value width for the diffraction peak of the (003) plane to the half-value width for the diffraction peak of the (104) plane is 0.72 or less, and particles of the lithium transition metal composite oxide have a peak differential pore volume of 0.33 mm$^3$/(g·nm) or less as determined by a BJH method from an adsorption isotherm using a nitrogen gas adsorption method". (Claim 1) and "A method for producing the positive active material for a nonaqueous electrolyte secondary battery according to any one of claims 1 to 7, the method comprising firing a hydroxide precursor of the transition metal and a lithium compound at a temperature of 800° C. or higher and 940° C. or lower". (Claim 8).

As in paragraph [0032] of Patent Document 1, Patent Document 2 describes that pH in the step of producing a hydroxide precursor can be set at 10.5 to 14, and it is preferable to control pH for increasing the tap density (paragraph [0031]).

Patent Document 2 further describes that in an initial charge-discharge step applied to a lithium secondary battery produced using a positive active material according to Example, "Charge was constant current-constant voltage charge with a current of 0.1 CmA and a voltage of 4.6 V" (paragraph [0093]).

Patent Document 3 discloses "An active material for a lithium secondary battery comprising: a solid solution of a lithium transition metal composite oxide having an α-NaFeO$_2$-type crystal structure, wherein a composition ratio of Li, Co, Ni, and Mn contained in the solid solution satisfies Li$_{1+(1/3)x}$Co$_{1-x-y}$Ni$_{(1/2)y}$Mn$_{(2/3)x+(1/2)y}$ where x+y≤1, 0≤y and 1-x-y=z; in an Li[Li$_{1/3}$Mn$_{2/3}$]O$_2$(x)–LiNi$_{1/2}$Mn$_{1/2}$O$_2$(y)–LiCoO$_2$(z) type ternary phase diagram, (x, y, z) is represented by values in a range present on or within a line of a heptagon (ABCDEFG) defined by vertexes; point A (0.45, 0.55, 0), point B (0.63, 0.37, 0), point C (0.7, 0.25, 0.05), point D (0.67, 0.18, 0.15), point E (0.75, 0, 0.25), point F (0.55, 0, 0.45), and point G (0.45, 0.2, 0.35); and an intensity ratio between diffraction peaks on (003) plane and (104) plane measured by X-ray diffractometry before charge-discharge is I(003)/I(104)≥1.56 and at an end of discharge is I(003)/I(104)>1". (Claim 1) and "The active material for a lithium secondary battery according to claim 1, wherein, in a case of being subjected to an initial charge process to reach at least a region with relatively flat fluctuation of potential appearing relative to an amount of charge in a positive electrode potential region exceeding 4.3 V (vs. Li/Li$^+$) and 4.8 V (vs. Li/Li$^+$) or less, a dischargeable electric amount in a potential region of 4.3 V (vs. Li/Li$^+$) or less is 180 mAh/g or more". (Claim 2).

In Examples, it is described that a crystal phase of a coprecipitated hydroxide precursor obtained by adjusting the pH to 11.5 is a "β-Ni(OH)$_2$ type single phase" (paragraphs [0099] to [0100]).

Patent Document 3 further describes that in an initial charge-discharge step applied to a lithium secondary battery produced using a positive active material according to Example, "Charge was constant current-constant voltage charge with a current of 0.1 ItA and a voltage of 4.5 V" (paragraph [0114]).

Patent Document 4 discloses "A positive active material for a lithium secondary battery being a lithium composite oxide in which 0.1 mol % or more and less than 5 mol % of one or two or more metal atoms (Me) selected from the group consisting of Mg, Al, Ti, Cu, and Zr is contained in a lithium nickel manganese cobalt composite oxide represented by the following general formula (1):

$$Li_xNi_yMn_zCo_{1-y-z}O_{1+x} \qquad (1)$$

(wherein x represents 1.02≤x≤1.25, y represents 0.30≤y≤0.40, and z represents 0.30≤z≤0.40), wherein an amount of Li$_2$CO$_3$ present on a particle surface is 0.05 to 0.20% by weight". (Claim 1).

Patent Document 4 further describes that "the lithium composite oxide has a tap density of 1.5 g/ml or more. The reason is that if the tap density of the lithium composite oxide is less than 1.5 g/ml, an electrode density tends to decrease, and the discharge capacity of the lithium secondary battery tends to decrease. In particular, it is preferable that the tap density of the lithium composite oxide be in the range of 1.7 to 2.8 g/ml, particularly from the viewpoint of increasing the discharge capacity of the lithium secondary battery". (paragraph [0021]).

In Examples, it is described that composite hydroxide samples A and B in which "the molar ratio of Ni:Co:Mn in the composite hydroxide=0.334:0.333:0.333" are mixed with lithium carbonate and a compound of Me and fired at 900° C. to obtain a lithium composite oxide sample having Li/(Ni+Co+Mn+Me) of 1.17 to 1.19 (see paragraphs [0067] to [0073] and [0084] and Table 3).

Patent Document 5 discloses "A lithium-nickel-manganese-cobalt composite oxide which has a pressed density of 3.3 to 4.5 g/cm$^3$ and in which a ratio of particles of 10 μm or less is 10 to 70% by volume in a volume-based particle size distribution". (Claim 1), and "The lithium-nickel-manganese-cobalt composite oxide according to claim 1 or 2, having a composition represented by the following chemical formula Li$_{1+a}$Ni$_b$Mn$_c$Co$_d$M$_e$O$_2$ (provided that M is a metal other than Ni, Mn, Co and Li)

$a+b+c+d+e=1$ $0<a≤0.2$ $0.2≤b/(b+c+d)≤0.4$ $0.2≤c/(b+c+d)≤0.4$ $0<d/(b+c+d)≤0.4$ $0≤e≤0.1$ wherein a BET specific surface area is 0.05 to 1.0 m$^2$/g". (Claim 3).

In Examples, a composite oxide which has a composition of Li$_{1.04}$[Ni$_{0.32}$Mn$_{0.32}$Co$_{0.32}$]O$_2$ and in which the pressed density at which a composite oxide is pressed at a pressure of 2 t/cm$^2$ is 3.56 g/cm$^3$, 3.43 g/cm$^3$, 3.52 g/cm$^3$, 3.47 g/cm$^3$, and 3.31 g/cm$^3$ is described (paragraphs [0075], [0082], [0086], [0090], and [0094]).

PRIOR ART DOCUMENTS

Patent Documents

Patent Document 1: JP-A-2014-029828
Patent Document 2: WO 2016/190419
Patent Document 3: JP-B-4877660
Patent Document 4: JP-A-2011-113792
Patent Document 5: JP-A-2008-013405

SUMMARY OF THE INVENTION

Problems to be Solved by the Invention

Standards (for example, "GB/T (Chinese Recommended National Standard)" to car batteries) stipulate that safety is ensured even when a nonaqueous electrolyte secondary battery is accidentally overcharged. As a method of evaluating improvement in safety, there is a method in which assuming that a charge control circuit is broken, when a current is further forcibly applied beyond the full charge state (SOC 100%), an SOC in which a sharp increase in battery voltage is observed is recorded. If the sharp increase in battery voltage is not observed until reaching a higher SOC, the safety is evaluated to be improved. Here, the SOC is an abbreviation of State Of Charge, which represents a state of charge of the battery as a ratio between the residual capacity at that time and the capacity at full charge, and the full charge state is expressed as "SOC 100%".

As shown in FIG. 1, when a positive electrode containing a lithium excess type active material is initially charged up to a potential of 5.0 V (vs. Li/Li$^+$), a region where a potential change relative to an amount of charge is relatively flat is observed in a positive electrode potential range of 4.5 to 5.0 V (vs. Li/Li$^+$). In the region (capacity band) where the potential change is flat, in a positive electrode which has been subjected to a charge process at least once until the region where the potential change is flat is terminated, the region where the potential change is flat is not observed again even when charge is performed up to 5.0 V (vs. Li/Li$^+$) after that. It is presumed that a nonaqueous electrolyte battery (for example, see Patent Documents 1 to 3) including a positive electrode containing a conventional lithium excess type active material is produced by charge up to termination of the above-described region where the potential change is flat during initial charge, and the nonaqueous electrolyte battery produced by such initial charge, whereby a high discharge capacity is obtained in a potential region of 4.3 V (vs. Li/Li$^+$) or less.

On the other hand, according to the present invention, it is presumed that a nonaqueous electrolyte battery is produced without passing through a charge process up to termination of the region where the potential change is flat, and used without charge up to termination of the region where the potential change is flat. By producing and using a nonaqueous electrolyte battery provided with a positive electrode containing a lithium excess type active material in this way, the above-described capacity band appears only when the nonaqueous electrolyte battery is accidentally overcharged. Therefore, it is possible to provide a battery in which when a current is further forcibly applied beyond the full charge state (SOC 100%), a sharp increase in battery voltage is not observed until reaching a higher SOC.

However, when the positive electrode containing a lithium excess type active material is produced without passing through the charge process up to termination of the region where the potential change is flat, and when the positive electrode is used without charge up to termination of the region where the potential change is flat, a conventional lithium excess type active material has a problem that the discharge capacity is small, as shown in Comparative Example 5 in FIG. 3.

In Patent Documents 1 to 3, the positive electrode containing a lithium excess type active material is subjected to charge at the time of initial charge-discharge until the region where the potential change is flat is terminated.

Patent Documents 4 and 5 describe an active material containing a lithium transition metal composite oxide of 1<Li/Me (transition metal). However, in the specifically described lithium transition metal composite oxide, the ratio of Ni:Co:Mn is 1:1:1, and since the content of Mn is small, this active material is not a positive active material in which the region where the potential change is flat is observed.

It is an object of the present invention to provide a positive active material which can provide a nonaqueous electrolyte secondary battery which has a large discharge capacity even when charged at a relatively low voltage and in which safety is further improved.

Means for Solving the Problems

One aspect of the present invention for solving the above problems is a positive active material for a nonaqueous electrolyte secondary battery containing a lithium transition metal composite oxide, in which the lithium transition metal composite oxide has an $\alpha$-NaFeO$_2$ structure, the molar ratio Li/Me of Li and a transition metal (Me) is 1<Li/Me, Ni and Mn, or Ni, Co, and Mn are included as the transition metals (Me), the molar ratio Mn/Me of Mn and Me is 0.4≤Mn/Me<0.6, when the lithium transition metal composite oxide is pressed at a pressure of 40 MPa, a density is 2.7 g/cm$^3$ or more, the lithium transition metal composite oxide has an X-ray diffraction pattern attributable to R3-m, and has an X-ray diffraction pattern which has a half-value width for a diffraction peak of a (104) plane at a Miller index hkl in X-ray diffraction measurement using a CuK$\alpha$ ray of 0.2° or more and 0.6° or less or has an X-ray diffraction pattern attributable to P3$_1$12, and has an X-ray diffraction pattern which has a half-value width for a diffraction peak of a (114) plane at the Miller index hkl in the X-ray diffraction measurement using the CuK$\alpha$ ray of 0.2° or more and 0.6° or less. Another aspect of the present invention is a positive electrode for a lithium secondary battery containing the positive active material. Another aspect of the present invention is a lithium secondary battery including the positive electrode.

Another aspect of the present invention is a transition metal hydroxide precursor used in production of a lithium transition metal composite oxide which has an $\alpha$-NaFeO$_2$ structure and in which the molar ratio Li/Me of Li and a transition metal (Me) is 1<Li/Me, and a method of producing the transition metal hydroxide precursor. The transition metal hydroxide precursor includes Ni and Mn, or Ni, Co, and Mn as transition metals (Me), the molar ratio Mn/Me of Mn and Me is 0.4≤Mn/Me<0.6, the transition metal hydroxide precursor contains $\alpha$Me(OH)$_2$ and $\beta$Me(OH)$_2$. In the method of producing the transition metal hydroxide precursor, a compound including Ni and Mn, or Ni, Co, and Mn is reacted in an aqueous solution having a pH of 10.2 or less.

Advantages of the Invention

The present invention can provide a positive active material which can provide a nonaqueous electrolyte secondary battery which has a large discharge capacity even when charged at a relatively low voltage and in which a sharp increase in battery voltage is not observed until reaching a higher SOC.

MODE FOR CARRYING OUT THE INVENTION

Figure 1:
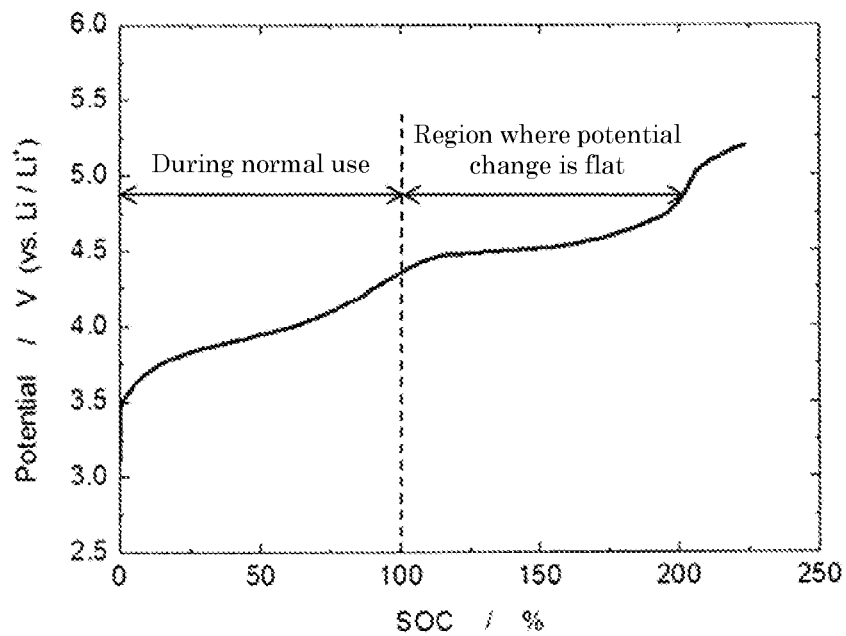
FIG. 1 is a conceptual diagram showing a typical charge curve of a positive electrode using a lithium excess type active material, and a region where a charge depth (SOC%) during production and use presupposed by the present invention and a potential change are flat.

The present inventor has conducted various studies on a crystal structure of a transition metal hydroxide precursor used in production of a lithium transition metal composite oxide and the composition and crystallinity of the lithium transition metal composite oxide and found that there is a condition under which it is possible to obtain an active material having a large amount of charge in a region where a potential change is flat and having a large discharge capacity even in the case of producing without passing through the charge process up to termination of the region where the potential change is flat, and using without charge up to termination of the region where the potential change is flat. The details will be described below.

<Lithium Transition Metal Composite Oxide>

A first embodiment of the present invention based on the above findings is a positive active material for a nonaqueous electrolyte secondary battery containing a lithium transition metal composite oxide, in which the lithium transition metal composite oxide has an $\alpha$-NaFeO$_2$ structure, the molar ratio Li/Me of Li and a transition metal (Me) is 1<Li/Me, Ni and Mn, or Ni, Co, and Mn are included as the transition metals (Me), the molar ratio Mn/Me of Mn and Me is 0.4≤Mn/Me<0.6, when the lithium transition metal composite oxide is pressed at a pressure of 40 MPa, a density is 2.7 g/cm³ or more, the lithium transition metal composite oxide has an X-ray diffraction pattern attributable to R3-m, and has an X-ray diffraction pattern which has a half-value width for a diffraction peak of a (104) plane at a Miller index hkl in X-ray diffraction measurement using a CuKα ray of 0.2° or more and 0.6° or less or has an X-ray diffraction pattern attributable to P3$_1$12, and has an X-ray diffraction pattern which has a half-value width for a diffraction peak of a (114) plane at the Miller index hkl in the X-ray diffraction measurement using the CuKα ray of 0.2° or more and 0.6° or less.

The composition of the lithium transition metal composite oxide is of a so-called "lithium excess type" that can be expressed as $Li_{1+\alpha}Me_{1-\alpha}O_2$ ($\alpha$>0).

<<Composition of Lithium Transition Metal Composite Oxide>>

In the first embodiment, in the lithium transition metal composite oxide represented by a composition formula $Li_{1+\alpha}Me_{1-\alpha}O_2$ ($\alpha$>0), the molar ratio Li/Me of Li to the transition metal element Me represented by (1+a)/(1−α) is more than 1. The molar ratio Li/Me is preferably 1.05 or more, and more preferably 1.10 or more. The molar ratio Li/Me is preferably less than 1.40, and more preferably 1.30 or less. When the molar ratio Li/Me is in this range, the discharge capacity of the positive active material is improved. The molar ratio Li/Me is more preferably 1.15 or more, and still more preferably 1.20 or more, from the viewpoint that the amount of charge in the region where the potential change is flat can be further increased.

The molar ratio Mn/Me of Mn to the transition metal element Me is 0.4 or more and less than 0.6. When the molar ratio Mn/Me is 0.4 or more, the amount of charge in the region where the potential change is flat can be increased. When the molar ratio Mn/Me is less than 0.6, it is possible to provide a positive active material having a large discharge capacity in the case of producing without passing through the charge process up to termination of the region where the potential change is flat, and using without charge up to termination of the region where the potential change is flat. The molar ratio Mn/Me of Mn is more preferably 0.55 or less, still more preferably 0.53 or less, and most preferably 0.50 or less.

Although Co contained in the lithium transition metal composite oxide has the effect of improving initial efficiency, Co is expensive because it is a scarce resource. Accordingly, the molar ratio Co/Me of Co to the transition metal element Me is preferably 0.35 or less, more preferably 0.20 or less, still more preferably 0.13 or less, and may be 0.

The molar ratio Ni/Me of Ni to the transition metal element Me is preferably 0.20 or more and 0.60 or less, and more preferably 0.25 or more and 0.55 or less. When the molar ratio Ni/Me is within this range, polarization in charge and discharge is reduced, so that the discharge capacity in the case of using without charge up to termination of the region where the potential change is flat is increased.

When the lithium transition metal composite oxide having the composition as described above is used for the positive active material, it is possible to obtain a nonaqueous electrolyte secondary battery having a large amount of charge in the region where the potential change is flat and having a large discharge capacity in the case of producing without passing through the charge process up to termination of the region where the potential change is flat, and using without charge up to termination of the region where the potential change is flat.

<<Crystallinity of Lithium Transition Metal Composite Oxide>>

A lithium transition metal composite oxide according to the first embodiment has an α-NaFeO$_2$ structure. The lithium transition metal composite oxide after synthesis (before charge-discharge) belongs to a space group P3$_1$12 or R3-m. In the lithium transition metal composite oxide belonging to the space group P3$_1$12, a superlattice peak (a peak found in a monoclinic crystal of $Li[Li_{1/3}Mn_{2/3}]O_2$ type) is observed in a range of 2θ=20 to 22° in an X-ray diffraction pattern using a CuKα tube. Here, the expression "being observed" means a ratio of a difference ($I_{21}$) between a maximum value and a minimum value of strength in a range of a diffraction angle of 20 to 22° to a difference ($I_{18}$) between a maximum value and a minimum value of strength in a range of a diffraction angle of 17 to 19°, that is, a value of "$I_{21}/I_{18}$" being in a range of 0.001 to 0.1. However, when charge and discharge are performed at least once up to a potential of 4.5 V (vs. Li/Li$^+$) or more, the superlattice peak disappears due to a change in symmetry of crystal accompanying elimination of Li in the crystal, so that the lithium transition metal composite oxide belongs to the space group R3-m. In other words, the superlattice peak is observed in the positive electrode after charge and discharge at a low current of 0.1 C, for example, at a charge upper limit voltage of 4.35 V and a discharge lower limit voltage of 2.5 V, using lithium metal as the counter electrode. On the other hand, the superlattice peak is not observed in the positive electrode after charge and discharge at a low current of 0.1 C, for example, at a charge upper limit voltage of 4.6 V and a discharge lower limit voltage of 2.0 V, using lithium metal as the counter electrode.

Here, P3$_1$12 is a crystal structure model in which atomic positions of 3a site, 3b site and 6c site in the R3-m are refined, and when regularity is recognized in atomic arrangement in the R3-m, the P3$_1$12 model is employed. Incidentally, "R3-m" should otherwise be denoted by affixing a bar "-" above "3" of "R3m".

In the lithium transition metal composite oxide according to the first embodiment, a half-value width of the diffraction peak belonging to the (104) plane, that is, a value of FWHM(104) is 0.2° or more and 0.6° or less when the space group R3-m is used for a crystal structure model based on the X-ray diffraction pattern. The FWHM (104) is an index of crystallinity from all directions. If the value is too small, crystallization proceeds too much, so that the size of a crystallite becomes large, and diffusion of Li ions is not sufficiently performed; therefore, the discharge capacity decreases. If the value is too large, the crystallinity is low, so that the transport efficiency of Li ions decreases, and the discharge capacity also decreases. Accordingly, the crystal structure according to the present embodiment makes it possible to increase the discharge capacity.

The diffraction peak present at 2θ=44.1°±1° is indexed to a (114) plane in the space group P3$_1$12 and indexed to a (104) plane in the space group R3-m. Accordingly, with respect to those belonging to the space group P3$_1$12, the part described as (104) in this specification should be read as (114).

In this specification, a half-value width of the lithium transition metal composite oxide is measured using an X-ray diffractometer (manufactured by Rigaku Corporation, model name: MiniFlex II). Specifically, the measurement is performed according to the following conditions and procedure.

The X-ray source is CuKα, and the acceleration voltage and current are 30 kV and 15 mA, respectively. A sampling width is 0.01 deg, a scanning time is 15 minutes (scanning speed: 5.0), a divergence slit width is 0.625 deg, a light receiving slit is open, and a scattering slit width is 8.0 mm. For the obtained X-ray diffraction data, without removing peaks derived from CuKα2, using "PDXL" which is software attached to the X-ray diffractometer, the half-value width FWHM (104) of the diffraction peak present at $2\theta=44\pm1°$ on the X-ray diffraction pattern indexed to the (104) plane in the space group R3-m is calculated.

<<Pressed Density of Lithium Transition Metal Composite Oxide>>

The lithium transition metal composite oxide according to the first embodiment has a density (hereinafter referred to as "pressed density") of 2.7 g/cm$^3$ or more when pressed at a pressure of 40 MPa.

The pressed density is 2.7 g/cm$^3$ or more, and both the above-described composition and crystallinity represented by the FWHM (104) are satisfied, so that the discharge capacity can be increased in the case of producing without passing through the charge process up to termination of the region where the potential change is flat, and using without charge up to termination of the region where the potential change is flat.

At a pressed density of less than 2.7 g/cm$^3$, a large discharge capacity cannot be obtained in the case of producing without passing through the charge process up to termination of the region where the potential change is flat, and using without charge up to termination of the region where the potential change is flat.

Even in a lithium excess type active material having a pressed density of 2.7 g/cm$^3$ or more, when the above-described composition and the crystallinity represented by the FWHM (104) are not satisfied, the discharge capacity is small in the case of producing without passing through the charge process up to termination of the region where the potential change is flat, and using without charge up to termination of the region where the potential change is flat.

As shown in Comparative Example 16 below, even when Li/Me is 1.1, when Mn/Me is less than 0.4, and as shown in Comparative Example 15, when Li/Me is 1.0, although the discharge capacity in a relatively low potential range is large, a region where the potential change is flat is not observed.

Figure 5:
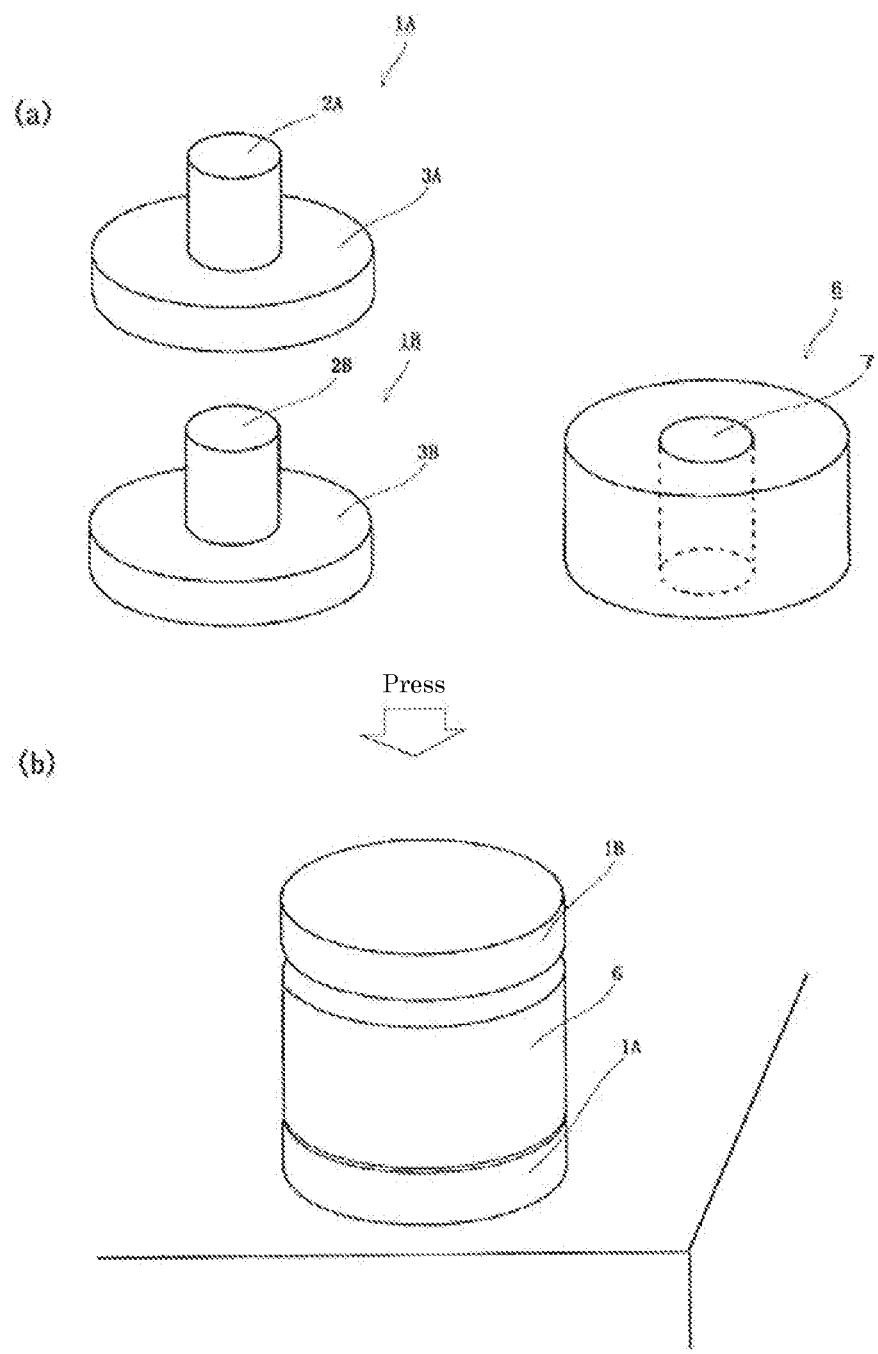
FIG. 5 is a conceptual diagram of a pressed density measurement apparatus.

In this specification, measurement conditions of the pressed density are as follows. The measurement is performed in air at a room temperature of 20° C. or higher and 25° C. or lower. FIG. 5 shows a conceptual diagram of an apparatus used for measuring the pressed density. A pair of measurement probes 1A and 1B are prepared. The measurement probes 1A and 1B have measurement surfaces 2A and 2B obtained by flattening one end of a cylinder made of stainless steel (SUS304) having a diameter of 8.0 mm(±0.05 mm), and at the other end, vertically fixing the cylinder to pedestals 3A and 3B (having an area of 10 cm$^2$ or more) made of stainless steel. At a center of an acrylic cylinder, a lateral body 6 having a polished through-hole 7 whose inner diameter is adjusted so that the stainless steel cylinder can naturally descend slowly in the air by gravity is prepared. The upper and lower surfaces of the lateral body 6 are polished smoothly.

The measurement probe 1A is placed on a horizontal desk such that the measurement surface 2A faces upward, and a cylindrical portion of the measurement probe 1A is inserted into the through-hole 7 of the lateral body 6 so as to cover the lateral body 6 from above. The measurement probe 1B is inserted from above the through-hole 7 with the measurement surface 2B facing down, and a distance between the measurement surfaces 2A and 2B is set to zero. At this time, a distance between the pedestal 3B of the measurement probe 1B and the pedestal 3A of the measurement probe 1A is measured using a caliper.

Next, the measurement probe 1B is pulled out, 0.3 g of a powder of a sample to be measured is charged with a dispensing spoon from above the through-hole 7, and the measurement probe 1B is inserted again from above the through-hole 7 with the measurement surface 2B facing down. An area of a contact portion to a jig (in this figure, a contact area to a 3A surface) is 10 cm$^2$, and the sample was pressed from above the measurement probe 1B using a manual hydraulic press with a pressure gauge until a pressure scale of the press reaches 2 MPa. After the scale reaches 2 MPa, no additional pressurization is performed even if the value indicated by the scale decreases. Thereafter, in this state, the distance between the pedestal 3B of the measurement probe 1B and the pedestal 3A of the measurement probe 1A is measured again using a caliper. A density of the sample to be measured under pressure is calculated from a difference (cm) from a distance before charging the sample to be measured, an area (0.50 cm$^2$) of the through-hole, and the charged amount (0.3 g) of the sample to be measured, and the resultant density is defined as the pressed density (g/cm$^3$). A pressure applied to an active material is calculated to be 40 MPa from a relationship between the area of the contact portion to the jig and an area (a contact area to the powder) of the measurement surface.

Although the tap density of the lithium transition metal composite oxide according to the first embodiment does not necessarily have a correlation with the effect of the present invention, in order to obtain a large pressed density, the tap density is preferably somewhat large. In this respect, the tap density is preferably 1.5 g/cm$^3$ or more, more preferably 1.6 g/cm$^3$ or more, and still more preferably 1.7 g/cm$^3$ or more.

In this specification, the tap density is measured according to the following procedure.

2 g±0.2 g of the powder of the sample to be measured is charged into a $10^{-2}$ dm$^3$ measuring cylinder, and using a tapping device manufactured by REI ELECTRIC CO., LTD., a value obtained by dividing a volume of the sample to be measured after counted tapping of 300 times by a mass of the charged sample is used.

The sample to be subjected to the various measurements described above is prepared according to the following procedure. If the sample is a lithium transition metal composite oxide powder (powder before charge and discharge) before production of the positive electrode, the sample is measured as it is. When a sample is collected from an electrode taken out from a disassembled battery, before the battery is disassembled, constant current discharge is performed up to a battery voltage, which is the lower limit of a designated voltage, at a current value (A) that is 1/10 of a nominal capacity (Ah) of the battery, and the battery is brought to a completely discharged state. As a result of disassembly, if the battery uses a metal lithium electrode as the negative electrode, the additional operation described below is not performed, and a positive composite collected from a positive electrode plate is to be measured. If the battery does not use a metal lithium electrode as the negative electrode, in order to accurately control a positive electrode potential, after the battery is disassembled to take out the electrode, a battery using a metal lithium electrode as the counter electrode is assembled. Constant current discharge is performed at a current value of 10 mA per 1 g of the positive composite until the voltage becomes 2.0 V (the potential of the positive electrode becomes 2.0 V (vs. Li/Li+)), and the battery is adjusted to the completely discharged state and then disassembled again. In the taken out positive electrode plate, a nonaqueous electrolyte attached to the electrode is sufficiently washed using dimethyl carbonate, and the positive electrode plate is dried at room temperature for 24 hours. Then, the composite on a current collector is collected. The operations from the disassembly to re-disassembly of the battery, and the washing and drying operations of the positive electrode plate are performed in an argon atmosphere having a dew point of −60° C. or lower.

As a sample to be subjected to X-ray diffraction measurement, the collected composite is lightly crushed in an agate mortar, placed in a sample holder for X-ray diffraction measurement, and subjected to measurement.

As a sample to be subjected to measurement of the pressed density and the tap density, the composite is fired at 600° C. for 4 hours using a small electric furnace to remove a conductive agent and a binder, and lithium transition metal composite oxide particles are taken out and subjected to the above measurement as an active material powder (a powder after charge and discharge).

<Transition Metal Hydroxide Precursor and Method of Producing the Same>

A transition metal hydroxide precursor used in production of the lithium transition metal composite oxide includes Ni and Mn, or Ni, Co, and Mn as transition metals (Me), and is preferably a mixture of a compound having an $\alpha Ni(OH)_2$-type crystal structure (hereinafter referred to as $\alpha Me(OH)_2$) and a compound having a $\beta Ni(OH)_2$-type crystal structure (hereinafter referred to as $\beta Me(OH)_2$).

A second embodiment of the present invention is a transition metal hydroxide precursor used in production of a lithium transition metal composite oxide which has an $\alpha$-NaFeO$_2$ structure and in which the molar ratio Li/Me of Li and a transition metal (Me) is 1<Li/Me, and a method of producing the transition metal hydroxide precursor. In the transition metal hydroxide precursor, Ni and Mn, or Ni, Co, and Mn are included as transition metals (Me), the molar ratio Mn/Me of Mn and Me is $0.4 \leq Mn/Me < 0.6$, and $\alpha Me(OH)_2$ and $\beta Me(OH)_2$ are contained.

In the second embodiment, a reason for limiting the molar ratio Mn/Me of the transition metal hydroxide precursor (hereinafter, also simply referred to as "precursor"), and a reason for limiting the molar ratio Li/Me of the lithium transition metal composite oxide produced using the transition metal hydroxide precursor are the same as those in the first embodiment.

The precursor is characterized to have a crystal structure containing $\alpha Me(OH)_2$ and $\beta Me(OH)_2$, and can increase the tap density as compared with the precursor having a crystal structure of $\alpha Me(OH)_2$ single phase or $\beta Me(OH)_2$ single phase. The lithium transition metal composite oxide with a high pressed density can be prepared using the precursor according to the second embodiment. The reason why the crystal structure of the transition metal hydroxide precursor is related to the tap density of the transition metal hydroxide precursor and the pressed density of the lithium transition metal composite oxide is not necessarily clear. However, the present inventor guesses as follows. In an $\alpha Me(OH)_2$ single-phase transition metal hydroxide, since a primary particle size of $\alpha Me(OH)_2$ which has a plate-like shape is large, a volume of a void between primary particles constituting secondary particles increases, and accordingly, it is considered that a density of the transition metal hydroxide precursor decreases. In production conditions of the transition metal hydroxide in which the $\beta Me(OH)_2$ single phase is generated, since the pH is high, nucleation is prioritized over particle growth of the transition metal hydroxide, so that many fine particles are generated. Accordingly, it is considered that the density of the transition metal hydroxide precursor therefore decreases. Therefore, it is considered that a transition metal hydroxide precursor having a high tap density can be obtained by adopting production conditions of a transition metal hydroxide in which a mixed phase of $\alpha Me(OH)_2$ and $\beta Me(OH)_2$ is generated, and since a lithium transition metal composite oxide is synthesized using a precursor having a high tap density, a lithium transition metal composite oxide having a high pressed density can be obtained.

The precursor can be produced by reacting a compound containing Ni and Mn or Ni, Co and Mn in an aqueous solution having a pH of 10.2 or less.

When the transition metal hydroxide precursor is produced by a coprecipitation method, the pH is usually 10.5 to 14, as described in Patent Documents 1 and 2. As described in Patent Document 3, the hydroxide precursor produced at pH 11.5 is a single phase of $\beta Me(OH)_2$. In contrast, in the precursor according to the second embodiment, a precursor containing $\alpha Me(OH)_2$ and $\beta Me(OH)_2$ can be produced by reacting a compound of a transition metal in an aqueous solution having a pH of 10.2 or less. When a lithium transition metal composite oxide prepared from such a precursor is used for a positive active material, electrode resistance is reduced, so that an amount of Li that can be extracted by charge up to a potential not reaching the region where the potential change is flat, for example, 4.35 V (vs. Li/Li+) increases, and a reversible capacity can be increased (see FIG. 3).

When the precursor is produced, preferably, a solution containing a transition metal (Me) and an alkali solution containing alkali metal hydroxide, a complexing agent, and a reducing agent are added to a reaction tank maintaining alkalinity, and the transition metal hydroxide is coprecipitated.

As the complexing agent, ammonia, ammonium sulfate, ammonium nitrate and the like can be used, and ammonia is preferable. A precursor having a higher tap density can be produced by a crystallization reaction using the complexing agent.

It is preferable to use a reducing agent together with the complexing agent. As the reducing agent, hydrazine, sodium borohydride, or the like can be used. In order to obtain a lithium transition metal composite oxide in which the pressed density of the active material is high, hydrazine is preferable.

As the alkali metal hydroxide (neutralizing agent), sodium hydroxide, lithium hydroxide or potassium hydroxide can be used.

In producing the hydroxide precursor, Mn of Ni, Co, and Mn is easily oxidized, and it is not easy to produce a coprecipitate precursor in which Ni and Mn, or Ni, Co, and Mn are uniformly distributed in a divalent state. Therefore, uniform mixing at an atomic level of Ni and Mn, or Ni, Co, and Mn tends to be insufficient. In the composition range of the second embodiment of the present invention, since the molar ratio Mn/Me of Mn and Me is 0.4 or more, it is important to remove dissolved oxygen in the aqueous solution. As a method of removing dissolved oxygen, a method of bubbling a gas containing no oxygen ($O_2$) can be used. The gas containing no oxygen is not limited, but a nitrogen gas, an argon gas, or the like can be used.

As described above, pH (reaction pH in a reaction tank) in a step of producing a hydroxide precursor by coprecipitating a compound containing Ni and Mn, or Ni, Co, and Mn in a solution is preferably 10.2 or less in order to obtain a precursor having a high tap density containing $\alpha Me(OH)_2$ and $\beta Me(OH)_2$. When the pH is 10.2 or less, the particle growth rate can be accelerated, so that a stirring duration after completion of dropwise addition of a raw material aqueous solution can be reduced. If the pH is too low, a precursor of $\alpha Me(OH)2$ single phase is formed (see Comparative Example 8 below), and therefore, the reaction pH preferably exceeds 9.

Figure 2:
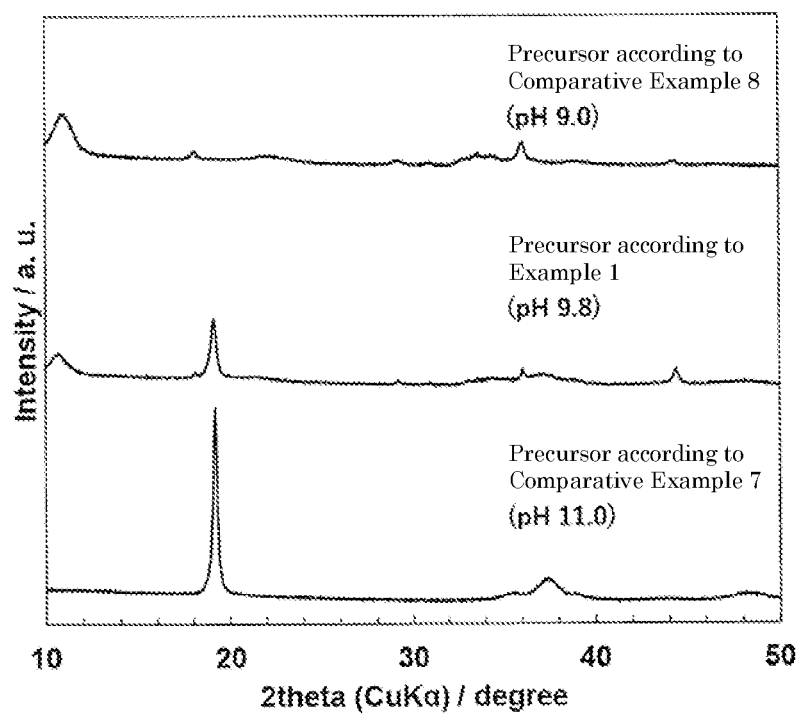
FIG. 2 is an X-ray diffraction diagram of a hydroxide precursor.

The precursor is a mixed phase of $\alpha Me(OH)_2$ and $\beta Me(OH)_2$. The fact that the precursor is the mixed phase is determined by the X-ray diffraction measurement described above. As shown in FIG. 2 below, the $\alpha Ni(OH)_2$-type crystal structure ($\alpha Me(OH)2$) has the largest peak at $2\theta=10$ to $12°$, and the $\beta Ni(OH)_2$-type crystal structure ($\beta Me(OH)_2$) has the largest peak at $2\theta=18$ to $20°$. Thus, after a background is processed with attached software, $I_{11}/I_{19}$ is calculated such that a maximum value of peak intensity at $2\theta=10$ to $12°$ is used as a numerator and a maximum value of peak intensity at $2\theta=18$ to $20°$ is used as a denominator, so that it is possible to determine a degree of mixing $\alpha Me(OH)_2$ with $\beta Me(OH)_2$.

The lower limit of $I_{11}/I_{19}$ is preferably 0.04, more preferably 0.05, and most preferably 0.08. The upper limit of $I_{11}/I_{19}$ is preferably 3.0, more preferably 2.0, and most preferably 1.0.

A method using a transition metal carbonate precursor as a precursor of a positive active material for a nonaqueous electrolyte secondary battery is also known. However, in general, when the transition metal carbonate precursor is used, a gas (mainly, carbon dioxide) is generated from the precursor during a firing process. Due to the gas generation, many pores are generated in the positive active material, so that the pressed density of the positive active material decreases.

Examples of raw materials for the hydroxide precursor include, as an Mn compound, manganese oxide, manganese carbonate, manganese sulfate, manganese nitrate, and manganese acetate; as an Ni compound, nickel hydroxide, nickel carbonate, nickel sulfate, nickel nitrate, and nickel acetate; and as a Co compound, cobalt sulfate, cobalt nitrate, and cobalt acetate.

Preferred is a method in which while a raw material aqueous solution (aqueous solution containing a transition metal) of the hydroxide precursor is supplied dropwise, a mixed alkaline solution containing an alkali metal hydroxide (neutralizing agent) such as sodium hydroxide, a complexing agent such as ammonia, and a reducing agent such as hydrazine is appropriately added dropwise. The concentration of the alkali metal hydroxide to be added dropwise is preferably 1.0 to 8.0 M. The concentration of the complexing agent is preferably 0.4 M or more, and more preferably 0.6 M or more. Further, the concentration of the complexing agent is preferably 2.0 M or less, more preferably 1.6 M or less, and still more preferably 1.5 M or less. The concentration of the reducing agent is preferably 0.05 to 1.0 M, and more preferably 0.1 to 0.5 M. The tap density of the hydroxide precursor can be increased by lowering the pH of the reaction tank and adjusting concentration of ammonia (complexing agent) to 0.6 M or more.

A rate of dropwise addition of the raw material aqueous solution has a large effect on the uniformity of an element distribution in a particle of the hydroxide precursor to be produced. Particularly, Mn hardly forms a uniform element distribution with Ni and Co, and therefore the rate of dropwise addition requires attention. A preferred rate of dropwise addition is affected by a size of the reaction tank, stirring conditions, a pH, a reaction temperature, etc. and the rate of dropwise addition is preferably 30 ml/min or less. For increasing the discharge capacity, the rate of dropwise addition is more preferably 10 ml/min or less, and most preferably 5 ml/min or less.

Further, when a complexing agent such as ammonia is present in the reaction tank and a certain convection condition is applied, rotation of particles and revolution in a stirring tank are accelerated by further continuing stirring after the completion of dropwise addition of the raw material aqueous solution, and in this process, particles grow stepwise in the form of a homocentric sphere while impinging on one another. That is, the hydroxide precursor is formed by undergoing two-staged reactions of a metal complex formation reaction in adding dropwise the aqueous solution of a raw material to the reaction tank and a precipitate formation reaction occurring while the metal complex remains in the reaction tank. Accordingly, by appropriately selecting a time during which stirring is further continued after the completion of dropwise addition of the raw material aqueous solution, a hydroxide precursor having a desired particle size can be obtained.

The stirring duration after the completion of dropwise addition of an aqueous solution of a raw material is preferably 0.5 hours or more, and more preferably 1 hour or more in order to grow particles as uniform spherical particles although a preferred stirring duration is affected by a size of the reaction tank, stirring conditions, a pH, and a reaction temperature. Further, the stirring duration is preferably 15 hours or less, more preferably 10 hours or less, and most preferably 5 hours or less in order to reduce a possibility that power performance in a low SOC region of a battery is insufficient due to a too large particle size.

D50 which is a particle size where a cumulative volume is 50% in a particle size distribution of secondary particles of the hydroxide precursor and the lithium transition metal composite oxide is preferably 13 μm or less. For that purpose, for example, when the pH is controlled so as to be 9.1 to 10.2, the stirring duration is preferably 1 to 3 hours.

When particles of the hydroxide precursor are produced using a sodium compound such as sodium hydroxide as a neutralizing agent, sodium ions attached to the particles are preferably cleaned and removed in a subsequent cleaning step. For example, the condition that the number of cleanings with 500 ml of ion-exchange water in taking out the produced hydroxide precursor by suction filtration is 6 times or more can be employed.

<Method of Producing Lithium Transition Metal Composite Oxide>

A third embodiment of the present invention is a method of producing a positive active material for a nonaqueous electrolyte secondary battery including mixing a lithium compound with the transition metal hydroxide precursor according to the second embodiment and firing the mixture at 750 to 1000° C. to produce a lithium transition metal composite oxide.

By setting the firing temperature in the above range, the crystallinity of the lithium transition metal composite oxide represented by the FWHM (104) can be set in a range suitable for the purpose of the present invention.

As the lithium compound, lithium hydroxide, lithium carbonate, lithium nitrate, lithium acetate and the like can be used. However, with respect to the amount of the lithium compound, it is preferred to charge the lithium compound in an excessive amount by about 1 to 5 mol % factoring in loss of a part thereof during firing.

The firing temperature affects the reversible capacity of the active material.

When the firing temperature is too high, the resulting active material corrupts in association with an oxygen releasing reaction and in addition to the hexagonal main phase, a phase defined as monoclinic $Li[Li_{1/3}Mn_{2/3}]O_2$ tends to be observed as a separate phase but not as a solid solution phase. It is not preferred to contain a too high proportion of such a separate phase since this leads to a reduction of the reversible capacity of the active material. With respect to such a material, impurity peaks are observed near 35° and 45° in the X-ray diffraction pattern. Accordingly, it is preferred that the firing temperature be adjusted lower than the temperature which affects the oxygen releasing reaction of the active material. An oxygen releasing temperature of the active material slightly differs depending on the composition of the active material, and when a lithium excess type active material is produced using the precursor according to the second embodiment, the oxygen releasing temperature of the active material is around 1000° C. or more. However, it is preferred to previously check the oxygen releasing temperature of the active material. Particularly, it is confirmed that the oxygen releasing temperature of a hydroxide precursor is shifted to the lower temperature as the Co amount contained in a sample is larger, and therefore the firing temperature requires attention. As a method for checking the oxygen releasing temperature of the active material, a mixture of a hydroxide precursor and a lithium compound may be subjected to thermal mass analysis (TG-DTA measurement) in order to simulate the firing reaction process; however in this method, platinum employed for a sample chamber of a measurement instrument may be possibly corroded with an evaporated Li component to damage the instrument. Therefore, a composition, of which crystallization has been promoted to a certain extent by employing a firing temperature of about 500° C. beforehand, is preferable to be subjected to thermal mass analysis.

On the other hand, when the firing temperature is too low, there is such a tendency that crystallization does not adequately proceed and an electrode performance is lowered. By adequate crystallization, resistance at a grain boundary can be reduced and smooth lithium ion transport can be promoted.

The present inventors have analyzed a half-value width of a diffraction peak of the lithium excess type active material in detail, and, as a result, they have found that a strain remains in a lattice in the sample synthesized at a temperature lower than 750° C., and most of the strain can be eliminated by synthesizing the active material at a temperature of 750° C. or higher. It has been also found that a size of a crystallite increased in proportion to a rise of a synthesis temperature. Thus, also in the case of using the precursor according to the second embodiment, it is preferable to produce the active material at a firing temperature capable of obtaining particles in which there is little lattice distortion in a system and a size of a crystallite adequately grows, specifically at a firing temperature at which an amount of the strain to a lattice constant is 2% or less and the size of a crystallite grows to 50 nm or more. When an electrode using this active material is charged and discharged, the crystallite size is changed by expansion and contraction. However, it has been found that the crystallite size is kept at 30 nm or more even in the charge-discharge process. That is, if the firing temperature is selected to be a temperature as close as possible to the above-described oxygen releasing temperature of the active material, an active material is first provided with remarkably high reversible capacity.

As described above, a preferable firing temperature differs depending on the oxygen releasing temperature depending on the composition of the active material. However, in order to obtain an active material having a sufficient discharge capacity under the use conditions assumed in the present invention, the firing temperature is preferably 750 to 1000° C., and more preferably 750 to 950° C.

<Positive Electrode for Nonaqueous Electrolyte Secondary Battery, and Nonaqueous Electrolyte Secondary Battery>

A fourth embodiment of the present invention is a positive electrode for a nonaqueous electrolyte secondary battery containing the positive active material of the first embodiment, and a nonaqueous electrolyte secondary battery including the positive electrode. By providing this positive electrode, it is possible to provide a nonaqueous electrolyte secondary battery having high safety and having a large discharge capacity when used in a potential range lower than the region where the potential change is flat.

<<Positive Electrode>>

The positive electrode according to the fourth embodiment includes a powder mainly composed of the positive active material according to the first embodiment. As other components, a conductive agent, a binder, a thickener, a filler, and the like may be contained.

The powder of the positive active material preferably has an average particle size of 100 μm or less. In particular, the powder of the positive active material preferably has an average particle size of 15 μm or less for the purpose of improving high power characteristics of a nonaqueous electrolyte battery. For obtaining a powder in a predetermined shape, there are a method of producing a precursor of a predetermined size and a method using a pulverizer, a classifier, and the like. For example, a mortar, a ball mill, a sand mill, a vibratory ball mill, a planetary ball mill, a jet mill, a counter jet mill, a whirling airflow type jet mill, a sieve or the like is used. At the time of pulverization, wet type pulverization in the presence of water or an organic solvent such as hexane can be also employed. A classification method is not particularly limited. A sieve or an air classifying apparatus may be employed based on the necessity for powders subjected to pulverization both in dry manner and in wet manner.

The conductive agent is not limited as long as it is an electron conductive material which does not cause an adverse effect on the battery characteristics. Usually, one or a mixture of conductive materials such as natural graphite (scaly graphite, flaky graphite, earthy graphite, and the like), artificial graphite, carbon black, acetylene black, ketjen black, carbon whisker, carbon fibers, metal (copper, nickel, aluminum, silver, gold, and the like) powder, metal fibers, and conductive ceramic materials can be contained as the conductive agent.

Among these, acetylene black is preferable as the conductive agent from the viewpoints of electron conductivity and coatability. The amount of the conductive agent to be added is preferably from 0.1% by mass to 50% by mass and particularly preferably from 0.5% by mass to 30% by mass based on the total mass of the positive electrode or the negative electrode. Especially, use of acetylene black after pulverized into ultrafine particles with a diameter of 0.1 to 0.5 μm is preferable since the amount of carbon to be needed can be lessened. A mixing method for mixing these components is physical mixing and homogeneous mixing is ideal. Therefore, mixing may be carried out in a dry manner or a wet manner by using a powder mixing apparatus such as a V-type mixing apparatus, an S-type mixing apparatus, an attriter, a ball mill, or a planetary ball mill.

As the binder, usually, thermoplastic resins such as polytetrafluoroethylene (PTFE), polyvinylidene fluoride (PVDF), polyethylene and polypropylene, and polymers having rubber elasticity, such as ethylene-propylene-diene terpolymers (EPDM), sulfonated EPDM, styrene butadiene rubber (SBR) and fluororubber can be used alone or as a mixture of two or more thereof. The amount of the binder to be added is preferably from 1% by mass to 50% by mass and particularly preferably from 2% by mass to 30% by mass based on the total mass of the positive electrode or the negative electrode.

The filler is not limited as long as it is a material that does not adversely affect the battery performance. Usually, olefin polymers such as polypropylene and polyethylene, amorphous silica, alumina, zeolites, glass, carbon, and the like are used. The amount of the filler to be added is preferably 30% by mass or less based on the total mass of the positive electrode or the negative electrode.

<<Negative Electrode>>

A negative active material used for a negative electrode of a nonaqueous electrolyte secondary battery is not limited. Any material which has a configuration of absorbing and releasing lithium ions can be selected. Examples of the negative material include, in addition to titanium materials such as lithium titanate having the spinel crystal structure typified by $Li[Li_{1/3}Ti_{5/3}]O_4$; Si, Sb, or Sn-based alloy material-lithium metal; lithium alloys (lithium metal-containing alloys such as lithium-silicon, lithium-aluminum, lithium-lead, lithium-tin, lithium-aluminum-tin, lithium-gallium, and wood's alloy); lithium composite oxides (lithium-titanium); and silicon oxide, and moreover, alloys, carbon materials (e.g. graphite, hard carbon, lower temperature calcined carbon, amorphous carbon) capable of absorbing and releasing lithium.

The negative active material is used as a powder similarly to the positive active material, and the negative electrode may contain other components similarly to the positive electrode.

<<Production of Positive and Negative Electrodes>>

The positive electrode and the negative electrode are preferably produced by kneading the above-described main components (each active material) and the other materials to obtain a composite, mixing the composite with an organic solvent, such as N-methylpyrrolidone or toluene, or water, thereafter, applying or pressure-bonding the obtained mixture solution to the current collector described in detail below, and carrying out heat treatment at a temperature of about 50 to 250° C. for about 2 hours. With respect to the above-described application method, it is preferable, for example, to carry out application in an arbitrary thickness and an arbitrary shape by using a technique such as roller coating with an applicator roller, screen coating, doctor blade coating, spin coating, or a bar coater; however the method is not limited to these examples.

As the current collector, a current collector foil such as an aluminum foil and a copper foil can be used. An aluminum foil is preferable as the current collector foil of the positive electrode, and a copper foil is preferable as the current collector foil of the negative electrode. The thickness of the current collector foil is preferably 10 to 30 μm. A thickness of a composite layer after pressing is preferably 40 to 150 μm (excluding the thickness of the current collector foil).

<<Nonaqueous Electrolyte>>

The nonaqueous electrolyte used for a nonaqueous electrolyte secondary battery is not limited, and those that are generally proposed to be used in lithium secondary batteries and the like can be used. Examples of a nonaqueous solvent to be used for the nonaqueous electrolyte include cyclic carbonic acid esters such as propylene carbonate, ethylene carbonate, butylene carbonate, chloroethylene carbonate, and vinylene carbonate; cyclic esters such as γ-butyrolactone, and γ-valerolactone; chain carbonates such as dimethyl carbonate, diethyl carbonate, and ethyl methyl carbonate; chain esters such as methyl formate, methyl acetate, and methyl butyrate; tetrahydrofuran and derivatives thereof; ethers such as 1,3-dioxane, 1,4-dioxane, 1,2-dimethoxyethane, 1,4-dibutoxyethane, and methyl diglyme; nitriles such as acetonitrile, and benzonitrile; dioxolane and derivatives thereof; ethylene sulfide, sulfolane, sultone and derivatives thereof, and these compounds may be used alone or two or more of them may be used in the form of a mixture; however, the nonaqueous solvent is not limited to these examples.

Examples of an electrolyte salt to be used for the nonaqueous electrolyte include inorganic ion salts containing one of lithium (Li), sodium (Na), and potassium (K) such as $LiClO_4$, $LiBF_4$, $LiAsF_6$, $LiPF_6$, LiSCN, LiBr, LiI, $Li_2SO_4Li_2B_{10}Cl_{10}$, $NaClO_4$, NaI, NaSCN, NaBr, $KClO_4$, and KSCN and organic ion salts such as $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $(CH_3)_4NBF_4$, $(CH_3)_4NBr$, $(C_2H_5)_4NClO_4$, $(C_2H_5)_4NI$, $(C_3H_7)_4NBr$, $(n-C_4H_9)_4NClO_4$, $(n-C_4H_9)_4NI$, $(C_2H_5)_4N$-maleate, $(C_2H_5)_4N$-benzoate, $(C_2H_5)_4N$-phthalate, lithium stearyl sulfonate, lithium octylsulfonate, and lithium dodecylbenzenesulfonate, and these ionic compounds may be used alone or two or more of them may be used in the form of a mixture.

Further, use of $LiPF_6$ or $LiBF_4$ and a lithium salt having a perfluoroalkyl group such as $LiN(C_2F_5SO_2)_2$ in the form of a mixture can further lower the viscosity of the electrolyte. Therefore, the low temperature characteristics can be further improved, and self-discharge can be suppressed. Consequently, use of such a mixture is more desirable.

A room temperature molten salt or an ionic liquid may be used as the nonaqueous electrolyte.

The concentration of the electrolyte salt in the nonaqueous electrolyte is preferably 0.1 mol/L to 5 mol/L and more preferably 0.5 mol/L to 2.5 mol/L in order to reliably obtain a nonaqueous electrolyte battery having high battery characteristics.

<<Separator>>

As a separator of a nonaqueous electrolyte secondary battery, porous membranes, nonwoven fabrics, and the like showing excellent high rate performance are preferably used alone or in combination. Examples of a material constituting a separator for a nonaqueous electrolyte battery include polyolefin resins typified by polyethylene and polypropylene; polyester resins typified by poly(ethylene terephthalate) and poly(butylene terephthalate); poly(vinylidene fluoride), vinylidene fluoride-hexafluoropropylene copolymers, vinylidene fluoride-perfluorovinyl ether copolymers, vinylidene fluoride-tetrafluoroethylene copolymers, vinylidene fluoride-trifluoroethylene copolymers, vinylidene fluoride-fluoroethylene copolymers, vinylidene fluoride-hexafluoroacetone copolymers, vinylidene fluoride-ethylene copolymers, vinylidene fluoride-propylene copolymers, vinylidene fluoride-trifluoropropylene copolymers, vinylidene fluoride-tetrafluoroethylene-hexafluoropropylene copolymers, and vinylidene fluoride-ethylene-tetrafluoroethylene copolymers.

Porosity of the separator is preferably 98% by volume or less from the viewpoint of strength. The porosity is preferably 20% by volume or more from the viewpoint of charge-discharge characteristics.

Further, as the separator, a polymer gel comprised of, for example, acrylonitrile, ethylene oxide, propylene oxide, methyl methacrylate, vinyl acetate, vinylpyrrolidone, a polymer such as poly(vinylidene fluoride) with an electrolyte may be used. Use of the nonaqueous electrolyte in the gel state as described above is preferable in terms of an effect of preventing liquid leakage.

Further, use of the porous membranes or nonwoven fabrics as described above in combination with the polymer gel for the separator is preferable because of improvement of a liquid retention property of the electrolyte. That is, a film is formed by coating the surface and fine pore wall faces of a polyethylene finely porous membrane with a solvophilic polymer in a thickness of several pm or thinner, and the electrolyte is maintained in the fine pores of the film, and thus causing gelation of the solvophilic polymer.

Examples of the solvophilic polymer include, in addition to poly(vinylidene fluoride), polymers obtained by crosslinking acrylate monomers having ethylene oxide groups, ester groups, or the like, epoxy monomers, monomers having isocyanato groups, and the like. These monomers can be crosslinked by radiating electron beams (EB) or adding a radical initiator and heating or radiating ultraviolet (UV) rays.

<<Configuration of Nonaqueous Electrolyte Secondary Battery>>

The configuration of the nonaqueous electrolyte secondary battery according to the fourth embodiment is not particularly limited, and examples include cylindrical batteries, prismatic batteries (rectangular batteries), and flat batteries having a positive electrode, a negative electrode and a roll-shaped separator.

Figure 6:
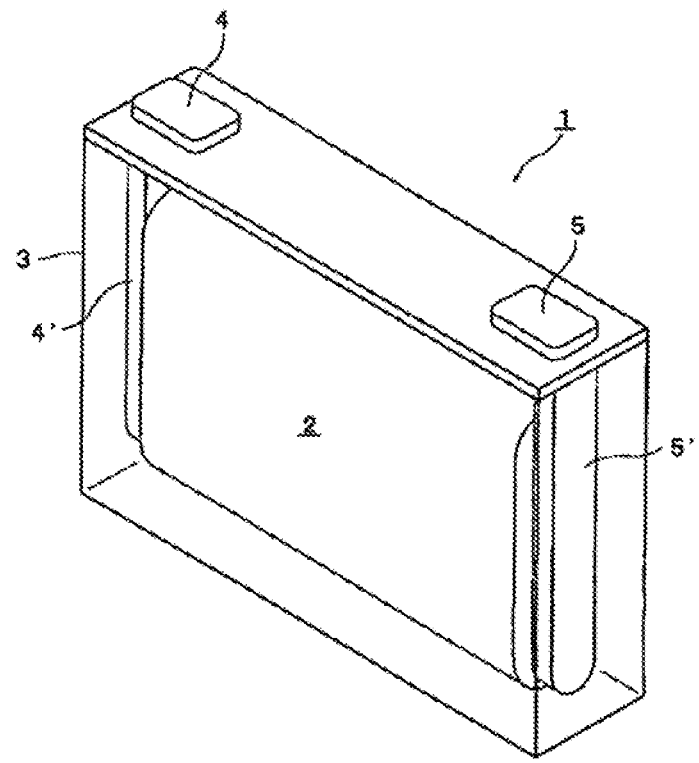
FIG. 6 is an external perspective view showing one embodiment of a nonaqueous electrolyte secondary battery according to the present invention.

FIG. 6 shows an external perspective view of a rectangular nonaqueous electrolyte secondary battery 1 according to an embodiment of the present invention. FIG. 6 is a view showing an inside of a case in a perspective manner. In the nonaqueous electrolyte secondary battery 1 shown in FIG. 6, an electrode group 2 is housed in a battery case 3. The electrode group 2 is formed by winding a positive electrode, including a positive active material, and a negative electrode, including a negative active material, with a separator interposed between the electrodes. The positive electrode is electrically connected to a positive electrode terminal 4 through a positive electrode lead 4', and the negative electrode is electrically connected to a negative electrode terminal 5 through a negative electrode lead 5'.

<<Configuration of Energy Storage Apparatus>>

Figure 7:
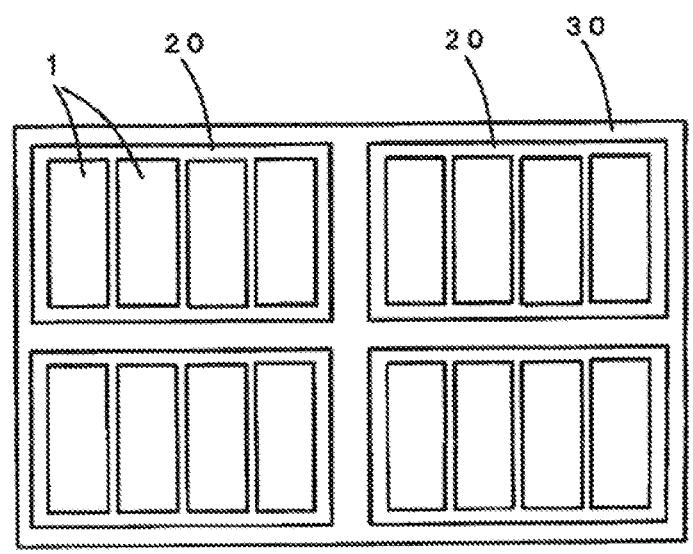
FIG. 7 is a schematic diagram showing an energy storage apparatus including a plurality of the nonaqueous electrolyte secondary batteries according to the present invention.

An embodiment of the present invention includes an energy storage apparatus including a plurality of the nonaqueous electrolyte secondary batteries described above. An energy storage apparatus 30 shown in FIG. 7 includes a plurality of energy storage units 20. Each of the energy storage units 20 includes a plurality of the nonaqueous electrolyte secondary batteries 1. The energy storage apparatus 30 can be mounted as a power source for an automobile such as an electric vehicle (EV), a hybrid vehicle (HEV), a plug-in hybrid vehicle (PHEV), or the like.

In the nonaqueous electrolyte secondary battery according to the fourth embodiment, it is presumed that the battery is produced without passing through a charge process up to termination of the region where the potential change is flat, and used without charge up to termination of the region where the potential change is flat. The charge voltage used during the charge process during producing and during use is preferably set such that a potential reached by the positive electrode by the charge, that is, a charge upper limit potential is equal to or lower than a potential at which the region where the potential change is flat starts. The charge upper limit potential can be, for example, 4.40 V (vs. $Li/Li^+$). The charge upper limit potential may be 4.38 V (vs. $Li/Li^+$), 4.36 V (vs. $Li/Li^+$), 4.34 V (vs. $Li/Li^+$), or 4.32 V (vs. $Li/Li^+$).

EXAMPLES

First, Examples and Comparative Examples in which production conditions of the lithium transition metal composite oxide having the same composition are changed will be described.

<Preparation of positive active material (lithium transition metal composite oxide)>

Example 1

In preparing the active material of Example 1, a transition metal hydroxide precursor was produced using a reaction crystallization method. First, 315.4 g of nickel sulfate hexahydrate, 168.6 g of cobalt sulfate heptahydrate, and 530.4 g of manganese sulfate pentahydrate were weighed, and all of these compounds were dissolved in 4 L of ion-exchanged water to prepare a 1.0 M sulfate aqueous solution in which the molar ratio of Ni:Co:Mn was 30:15:55. Next, 2 L of ion-exchange water was poured in a 5 L reaction tank, and an $N_2$ gas was bubbled for 30 min to remove oxygen in the ion-exchange water. The temperature of the reaction tank was set at 50° C. (±2° C.), and the reaction tank was set so as to have a sufficient convection therein while the contents in the reaction tank was stirred at a rotation speed of 1500 rpm using a paddle impeller equipped with a stirring motor. The sulfate stock solution was added dropwise to the reaction tank at a rate of 1.3 ml/min for 50 h. Here, during a time period between the start and the end of the dropwise addition, a mixed alkaline solution including 4.0 M sodium hydroxide, 1.25 M ammonia and 1.0 M hydrazine was appropriately added dropwise to perform control so that the pH in the reaction tank was always 9.8 (±0.1), and a part of the reaction solution was discharged through overflow to perform control so that the total amount of the reaction solution was always 2 L or less. After completion of dropwise addition, stirring the contents in the reaction tank was continued for further 1 hour. After stirring was stopped, the reaction tank was left standing at room temperature for 12 hours or more.

Next, hydroxide precursor particles generated in the reaction tank were separated using a suction filtration device, sodium ions deposited on the particles were further washed off using ion-exchange water, and the particles were dried at 80° C. for 20 hours under normal pressure in air atmosphere using an electric furnace. Thereafter, the particles were ground with an agate automatic mortar for several minutes to equalize the particle size. Thus, a transition metal hydroxide precursor was produced.

1.294 g of lithium hydroxide monohydrate was added to 2.262 g of the transition metal hydroxide precursor, and the mixture was adequately mixed using an automatic mortar made of agate to prepare a mixed powder of which the molar ratio of Li:(Ni, Co, Mn) was 120:100. Using a pellet molding machine, the mixed powder was molded at a pressure of 13.5 MPa to provide pellets having a diameter of 25 mm. The amount of the mixed powder subjected to pellet molding was determined by performing calculation in such a manner that the estimated mass of a final product was 2.5 g. One of the pellets was placed in an alumina boat having a total length of about 100 mm, the boat was placed in a box-type electric furnace (model: AMF 20), the temperature was elevated from ordinary temperature to 800° C. under normal pressure in an air atmosphere over 10 hours, and the pellet was fired at 800° C. for 4 hours. The box-type electric furnace has an internal dimension of 10 cm (height), 20 cm (width) and 30 cm (depth), and is provided with electrically heated wires at intervals of 20 cm in the width direction. After firing, a heater was switched off, and the alumina boat was naturally cooled as it was left standing in the furnace. As a result, the temperature of the furnace decreased to about 200° C. after 5 hours, and thereafter the temperature slightly gently decreased. After elapse of a whole day and night, the pellet was taken out after confirming that the temperature of the furnace was 100° C. or lower, and the pellet was ground with an agate automatic mortar for several minutes for equalizing the particle size. In this way, a lithium transition metal composite oxide $Li_{1.09}Ni_{0.27}Co0.14Mn0.50O_2$ according to Example 1 was prepared.

Examples 2 to 5

Lithium transition metal composite oxides according to Examples 2 to 5 were prepared in the same manner as in Example 1, except that a mixed powder of a transition metal hydroxide precursor and lithium hydroxide monohydrate was fired at 850° C., 900° C., 1000° C. and 750° C., respectively.

Examples 6 and 7

Lithium transition metal composite oxides according to Examples 6 and 7 were prepared in the same manner as in Example 1, except that the pH of a reaction tank was 10.0 and 10.2 in producing a transition metal hydroxide precursor.

Comparative Examples 1 to 4

Lithium transition metal composite oxides according to Comparative Examples 1 to 4 were prepared in the same manner as in Example 1, except that a mixed powder of a transition metal hydroxide precursor and lithium hydroxide monohydrate was fired at 700° C., 650° C., 1050° C. and 1200° C., respectively.

Comparative Examples 5 to 9

Lithium transition metal composite oxides according to Comparative Examples 5 to 8 were prepared in the same manner as in Example 1, except that the pH of a reaction tank was 10.5, 10.7, 11.0, and 9.0 in producing a transition metal hydroxide precursor.

Lithium transition metal composite oxide according to Comparative Example 9 was prepared in the same manner as in Comparative Example 7, except that the temperature at which a transition metal hydroxide precursor and lithium hydroxide monohydrate were fired was changed to 650° C.

<Confirmation of Crystal Phase of Precursor>

The crystal phases of the transition metal hydroxide precursors produced in the above Examples and Comparative Examples, and Examples and Comparative Examples below were measured using an X-ray diffractometer (manufactured by Rigaku Corporation, product name: MiniFlex II) according to the X-ray diffraction measurement method.

For reference, results of the X-ray diffraction measurement of the precursor are shown in FIG. 2. In Comparative Example 7 synthesized when the pH of the reaction tank was 11.0, a diffraction line derived from the $\beta Ni(OH)_2$-type crystal structure was observed. In Comparative Example 8 synthesized when the pH of the reaction tank was 9.0, a diffraction line derived from the $\alpha Ni(OH)_2$-type crystal structure was observed. On the other hand, in Example 1 synthesized when the pH of the reaction tank was 9.8, a mixed phase of $\alpha Ni(OH)_2$-type crystal structure and $\beta Ni(OH)_2$-type crystal structure was observed. The $\alpha Ni(OH)_2$-type crystal structure has the largest peak at $2\theta=10$ to $12°$, and the $\beta Ni(OH)_2$-type crystal structure has the largest peak at $2\theta=18$ to $20°$.

<Calculation of Peak Intensity Ratio> $I_{11}/I_{19}$ was calculated using the maximum value of the peak intensity at $2\theta=10$ to $12°$ as a numerator and the maximum value of the peak intensity at $2\theta=18$ to $20°$ as a denominator. That is, $I_{11}/I_{19}$ can be said to be an index indicating an extent to which $\alpha$-type and $\beta$-type are present. Here, in any case, background processing is performed with attached software.

<Confirmation of Crystal Structure and Half-Value Width of Lithium Transition Metal Composite Oxide>

The half-value widths of the lithium transition metal composite oxides according to the above Examples and Comparative Examples, and Examples and Comparative Examples below were measured according to the above-described conditions and procedures. In any case, the presence of the $\alpha$-$NaFeO_2$-type crystal structure was confirmed by matching the structure model with the diffraction pattern in the X-ray diffraction measurement. Using "PDXL" which was software attached to the X-ray diffractometer, the half-value width FWHM (104) of the diffraction peak present at $2\theta=44\pm1°$ on the X-ray diffraction pattern indexed to the (104) plane in the space group R3-m was determined.

In Examples 1 to 23 and Comparative Examples 1 to 13, a superlattice peak specific to a lithium excess type positive active material was observed in the range of $2\theta=20$ to $22°$.

<Measurement of Tap Density and Pressed Density>

The tap densities and the pressed densities of the lithium transition metal composite oxides according to the above Examples and Comparative Examples, and Examples and Comparative Examples below were measured according to the above-described conditions and procedures.

<Production of Positive Electrode for Nonaqueous Electrolyte Secondary Battery>

The positive electrodes for a nonaqueous electrolyte secondary battery according to Examples and Comparative Examples were produced in the following procedure, using the lithium transition metal composite oxides according to the above Examples and Comparative Examples, and Examples and Comparative Examples below for the positive active material.

A coating paste was prepared in which the positive active material, acetylene black (AB) and polyvinylidene fluoride (PVdF) were kneaded at a ratio of 90:5:5 in terms of a mass ratio and dispersed with N-methylpyrrolidone as a dispersion medium. The coating paste was applied to one surface of an aluminum foil current collector having a thickness of 20 μm, dried, and then pressed to produce a positive electrode plate. The mass of the active material coated per fixed area and the porosity after pressing were adjusted to be equalized in all Examples and Comparative Examples.

<Production of Nonaqueous Electrolyte Secondary Battery>

The positive electrode for a nonaqueous electrolyte secondary battery produced as described above was partially cut out, and a test battery as a nonaqueous electrolyte secondary battery was produced by the following procedure.

For the purpose of accurately observing the independent behavior of a positive electrode, metallic lithium was brought into close contact with a nickel foil current collector and used for a counter electrode, i.e. a negative electrode. Here, a sufficient amount of metallic lithium was placed on the negative electrode so that the capacity of the nonaqueous electrolyte secondary battery was not limited by the negative electrode.

As a nonaqueous electrolyte, a solution obtained by dissolving $LiPF_6$, so as to be 1 mol/L in concentration, in a mixed solvent of ethylene carbonate (EC)/ethylmethyl carbonate (EMC)/dimethyl carbonate (DMC) in a volume ratio of 6:7:7, was used. As a separator, a microporous membrane made of polypropylene, the surface of which was modified with polyacrylate, was used. As an outer case, a metal resin composite film made of polyethylene terephthalate (15 μm)/aluminum foil (50 μm)/metal-adhesive polypropylene film (50 μm) was used. The electrode was housed such that the open ends of a positive electrode terminal and a negative electrode terminal were externally exposed, fusion margins with the inner surfaces of the above-described metal resin composite films facing each other were airtightly sealed except a portion forming an electrolyte solution filling hole, and the nonaqueous electrolyte was injected, followed by sealing the electrolyte solution filling hole.

Since the counter electrode is made of metallic lithium, a battery voltage (V) may be directly read as a positive electrode potential (V. vs $Li/Li^+$).

<Initial Charge-Discharge Step>

The nonaqueous electrolyte secondary battery assembled by the above procedure is completed through an initial charge-discharge step. Here, in the initial charge-discharge step, batteries are divided into a first group to which the initial charge-discharge condition 1 is applied and a second group to which the initial charge-discharge condition 2 is applied.

(Initial Charge-Discharge Condition 1)

The batteries of the first group were used and subjected to an initial charge-discharge step under the following conditions. Under an environment of 25° C., charge was constant current-constant voltage charge with a current of 0.1 C and a voltage of 4.35 V, and the condition of the end-of-charge was set at a time point at which the current value was reduced to 0.02 C. Discharge was constant current discharge with a current of 0.1 C and an end voltage of 2.5 V. This charge-discharge cycle was carried out once. A rest step of 10 minutes was provided after charge.

The amount of charge and the discharge capacity at this time were recorded as the "amount of charge during charge at 4.35 V" and the "discharge capacity during charge at 4.35 V", respectively. That is, the "discharge capacity during charge at 4.35 V" is an index indicating the discharge capacity in the case of producing without passing through the charge process up to termination of the region where the potential change is flat, and using in a lower potential range without charge up to termination of the region where the potential change is flat.

(Initial Charge-Discharge Condition 2)

The batteries of the second group were used and subjected to an initial charge-discharge step under the following conditions. Under an environment of 25° C., charge was constant current-constant voltage charge with a current of 0.1 C and a voltage of 4.6 V, and the condition of the end-of-charge was set at a time point at which the current value was reduced to 0.02 C. Discharge was constant current discharge with a current of 0.1 C and an end voltage of 2.0 V. This charge-discharge cycle was carried out once. A rest step of 10 minutes was provided after charge.

A difference between the amount of charge at this time and the "amount of charge during charge at 4.35 V" was calculated as the "amount of charge between 4.35 V and 4.6 V". That is, the "amount of charge between 4.35 V and 4.6 V" is an index indicating the amount of charge in the region where the potential change is flat.

Table 1 shows the above results.

Figure 3:
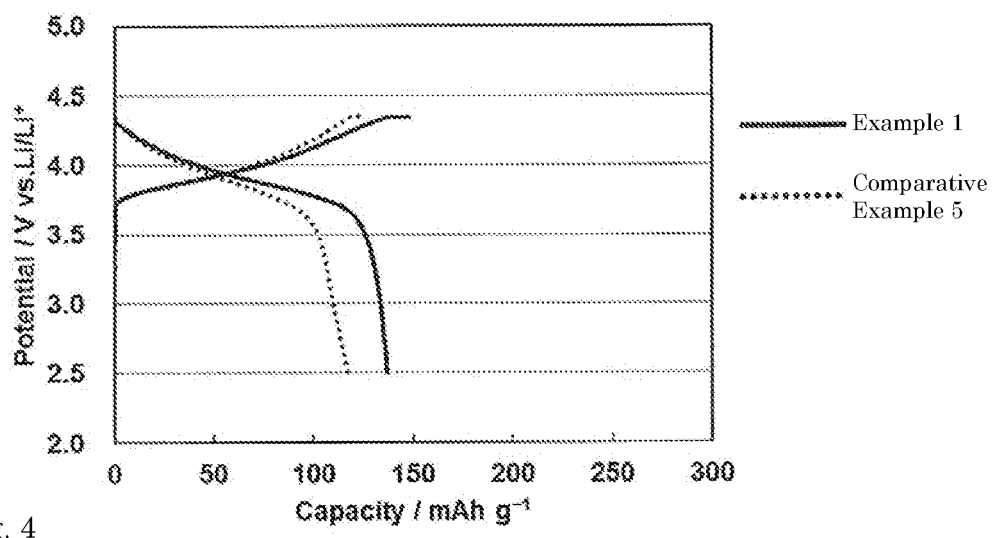
FIG. 3 is a charge-discharge curve of the positive electrode using the lithium excess type active material.
Figure 4:
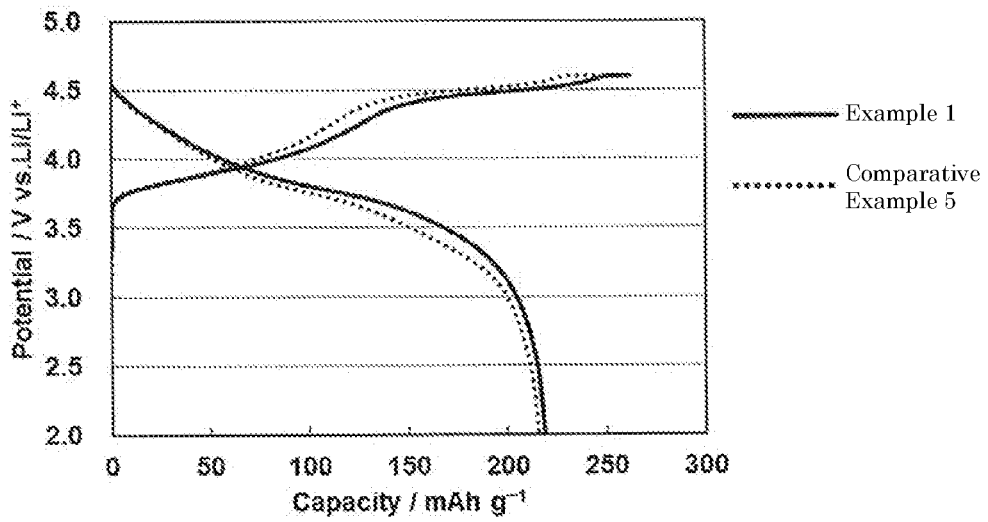
FIG. 4 is a charge-discharge curve of the positive electrode using the lithium excess type active material.

Charge-discharge curves of the positive electrodes according to Example 1 and Comparative Example 5 in the initial charge-discharge step are illustrated. FIG. 3 is the charge-discharge curve when the "initial charge-discharge condition 1" is adopted, and FIG. 4 is the charge-discharge curve when the "initial charge-discharge condition 2" is adopted. When the charge voltage is 4.6 V, Example 1 and Comparative Example 5 show an equivalent discharge capacity; however, when the charge voltage is 4.35 V, the discharge capacity is reduced by 10% or more in Comparative Example 5.

TABLE 1

| | Transition metal composition Ni/Co/Mn [mol %] | Li/Me ratio [Molar ratio] | Firing temperature ° C. | pH of reaction tank | Crystal phase of precursor | $I_{11}I_{19}$ | TAP density [g/cm 3] | Pressed density [g/cm 3] | FW HM (104) [°] | Discharge capacity during charge at 4.35 V [m Ah/g] | Amount of charge between 4.35 V and 4.6 V [m Ah/g] |
|---|---|---|---|---|---|---|---|---|---|---|---|
| Example 1 | 30/15/55 | 1.2 | 800 | 9.8 | $\alpha Me(OH)_2 + \beta Me(OH)_2$ | 0.32 | 2.04 | 2.91 | 0.466 | 137 | 115 |
| Example 2 | 30/15/55 | 1.2 | 850 | 9.8 | $\alpha Me(OH)_2 + \beta Me(OH)_2$ | 0.32 | 2.06 | 2.92 | 0.413 | 138 | 112 |
| Example 3 | 30/15/55 | 1.2 | 900 | 9.8 | $\alpha Me(OH)_2 + \beta Me(OH)_2$ | 0.32 | 2.04 | 2.92 | 0.365 | 136 | 108 |
| Example 4 | 30/15/55 | 1.2 | 1000 | 9.8 | $\alpha Me(OH)_2 + \beta Me(OH)_2$ | 0.32 | 1.94 | 3.13 | 0.229 | 133 | 104 |
| Example 5 | 30/15/55 | 1.2 | 750 | 9.8 | $\alpha Me(OH)_2 + \beta Me(OH)_2$ | 0.32 | 1.95 | 2.88 | 0.517 | 137 | 126 |
| Example 6 | 30/15/55 | 1.2 | 800 | 10.0 | $\alpha Me(OH)_2 + \beta Me(OH)_2$ | 0.05 | 1.82 | 2.85 | 0.442 | 135 | 113 |
| Example 7 | 30/15/55 | 1.2 | 800 | 10.2 | $\alpha Me(OH)_2 + \beta Me(OH)_2$ | 0.03 | 1.82 | 2.87 | 0.414 | 134 | 116 |
| Comparative Example 1 | 30/15/55 | 1.2 | 700 | 9.8 | $\alpha Me(OH)_2 + \beta Me(OH)_2$ | 0.32 | 2.06 | 2.85 | 0.602 | 128 | 138 |
| Comparative Example 2 | 30/15/55 | 1.2 | 650 | 9.8 | $\alpha Me(OH)_2 + \beta Me(OH)_2$ | 0.32 | 2.06 | 2.82 | 0.669 | 127 | 139 |
| Comparative Example 3 | 30/15/55 | 1.2 | 1050 | 9.8 | $\alpha Me(OH)_2 + \beta Me(OH)_2$ | 0.32 | 2.07 | 3.02 | 0.182 | 119 | 104 |
| Comparative Example 4 | 30/15/55 | 1.2 | 1200 | 9.8 | $\alpha Me(OH)_2 + \beta Me(OH)_2$ | 0.32 | 2.05 | 3.01 | 0.178 | 106 | 105 |

TABLE 1-continued

| | Transition metal composition Ni/Co/Mn [mol %] | Li/Me ratio [Molar ratio] | Firing temperature ° C. | pH of reaction tank | Crystal phase of precursor | $I_{11}I_{19}$ | TAP density [g/cm 3] | Pressed density [g/cm 3] | FWHM (104) [°] | Discharge capacity during charge at 4.35 V [m Ah/g] | Amount of charge between 4.35 V and 4.6 V [m Ah/g] |
|---|---|---|---|---|---|---|---|---|---|---|---|
| Comparative Example 5 | 30/15/55 | 1.2 | 800 | 10.5 | βMe(OH)$_2$ | 0.01 | 1.31 | 2.63 | 0.448 | 126 | 136 |
| Comparative Example 6 | 30/15/55 | 1.2 | 800 | 10.7 | βMe(OH)$_2$ | 0.01 | 1.08 | 2.50 | 0.434 | 122 | 125 |
| Comparative Example 7 | 30/15/55 | 1.2 | 800 | 11.0 | βMe(OH)$_2$ | 0.01 | 1.28 | 2.49 | 0.441 | 117 | 125 |
| Comparative Example 8 | 30/15/55 | 1.2 | 800 | 9.0 | βMe(OH)$_2$ | 21.33 | 1.22 | 2.41 | 0.442 | 129 | 109 |
| Comparative Example 9 | 30/15/55 | 1.2 | 650 | 11.0 | βMe(OH)$_2$ | 0.01 | 1.13 | 2.38 | 0.606 | 126 | 138 |

The positive active materials shown in Table 1 all have the same composition. In Examples 1 to 5 and Comparative Examples 1 to 4, the reaction pH is also the same, 9.8 when the transition metal hydroxide precursor is produced, and the precursor contains α-type and β-type crystal phases.

However, in Examples 1 to 5 in which the precursor and the lithium compound are fired at 750 to 1000° C., the FWHM (104) of the lithium transition metal composite oxide is in the range of 0.2 to 0.6°. On the other hand, in Comparative Examples 1 to 4 in which the firing temperature is out of 750 to 1000° C., when the firing temperature is lower than 750° C., a lithium transition metal composite oxide having a FWHM (104) of more than 0.6° is obtained, and when the firing temperature exceeds 1000° C., a lithium transition metal composite oxide having a FWHM (104) of less than 0.2° is obtained. In Examples 1 to 5 satisfying the production conditions of the present invention, it is found that the "discharge capacity during charge at 4.35 V" is larger than Comparative Examples 1 to 4.

In Examples 6 and 7 and Comparative Examples 5 to 8, in the production of the transition metal hydroxide precursor, the pH of the reaction tank is 10.0, 10.2, 10.5, 10.7, 11.0, and 9.0, respectively, with respect to 9.8 in Example 1. In Comparative Example 9, the pH of the reaction tank is 11.0, and the firing temperature is 650° C. In Examples 6 and 7 in which the pH of the reaction tank was 10.2 or less, the precursor contains the α-type and β-type crystal phases, and the lithium transition metal composite oxide prepared using this precursor has a pressed density of exceeding 2.7 g/cm$^3$.

On the other hand, the precursors according to Comparative Examples 5 to 7 and 9 in which the pH of the reaction tank exceeds 10.2 are β-type single phases, and the precursor according to Comparative Example 8 in which the pH of the reaction tank is 9.0 is an α-type single phase. In the lithium transition metal composite oxides prepared using the single-phase precursors according to Comparative Examples 5 to 9, the pressed density does not exceed 2.7 g/cm$^3$ even when the firing temperature is 800° C.

In addition, in Comparative Example 9, the firing temperature is low, and the FWHM (104) is as large as exceeding 0.6°, so that crystallization is insufficient.

In Comparative Examples 5 to 9, it is found that the "discharge capacity during charge at 4.35 V" does not exceed Examples 1 to 7.

In comparing (only the pH of the reaction tank is different) Example 1 and Comparative Example 5 in FIGS. 3 and 4, when the nonaqueous electrolyte secondary battery is produced by adopting an initial charge condition (initial charge-discharge condition 2) up to 4.6 V (vs. Li/Li$^+$) through the charge process up to termination of the region where the potential change is flat, almost no effect of the condition of the pH of the reaction tank on the discharge capacity is observed. However, when the nonaqueous electrolyte secondary battery is produced by adopting an initial charge condition (initial charge-discharge condition 1) up to 4.35 V (vs. Li/Li$^+$) without passing through the charge process up to termination of the region where the potential change is flat, it is found that the effect of the condition of the pH of the reaction tank on the "discharge capacity during charge at 4.35 V" is remarkable.

Next, Examples and Comparative Examples in which the composition and/or production conditions of the lithium transition metal composite oxide are changed are described below.

Example 8

A lithium transition metal composite oxide according to Example 8 was prepared in the same manner as in Example 1, except that the composition of a transition metal hydroxide precursor was adjusted to 40:5:55 in the molar ratio of Ni:Co:Mn, and the molar ratio of Li:(Ni, Co, Mn) of a mixed powder of the transition metal hydroxide precursor and a lithium compound was adjusted to 110:100.

Example 9

A lithium transition metal composite oxide according to Example 9 was prepared in the same manner as in Example 1, except that the composition of a transition metal hydroxide precursor was adjusted to 45:5:50 in the molar ratio of Ni:Co:Mn, the pH of a reaction tank was 10.0 in the production of the transition metal hydroxide precursor, the molar ratio of Li:(Ni, Co, Mn) of a mixed powder of the transition metal hydroxide precursor and a lithium compound was adjusted to 110:100, and the mixed powder was fired at 850° C.

Examples 10 to 23

Lithium transition metal composite oxides according to Examples 10 to 23 were prepared in the same manner as in Example 1, except that the molar ratio of Ni:Co:Mn of a transition metal hydroxide precursor, the molar ratio Li/Me of a transition metal of the precursor and a lithium compound, the pH of a reaction tank, and the firing temperature of the precursor and the lithium compound were changed to the conditions shown in Table 2 below.

Comparative Examples 10 to 13

Lithium transition metal composite oxides according to Comparative Examples 10 to 13 were prepared in the same manner as in Example 1, except that the composition of a transition metal hydroxide precursor was adjusted to 30:10:60 in the molar ratio of Ni:Co:Mn, an ammonia concentration added dropwise to the reaction tank was 0.6 M, a hydrazine concentration was 0.3 M (Comparative Examples 10 and 11) or 0.2 M (Comparative Examples 12 and 13), a precursor was produced such that the pH of the reaction tank was changed to the condition shown in Table 2 below, the molar ratio Li/Me of a transition metal and a lithium compound of the precursor was adjusted to 1.3, and firing was performed at the firing temperature shown in Table 2 below.

Comparative Example 14

A lithium transition metal composite oxide according to Comparative Example 14 was prepared in the same manner as in Example 1, except that the molar ratio Li/Me of Li:Me of a mixed powder of a transition metal hydroxide precursor and a lithium compound was 1.0.

Comparative Examples 15 and 16

Lithium transition metal composite oxides according to Comparative Examples 15 and 16 were prepared in the same manner as in Example 1, except that the composition of a transition metal hydroxide precursor was adjusted to 33:33:33 (1:1:1) in the molar ratio of Ni:Co:Mn, the pH of a reaction tank was 10.0, and the molar ratio Li/Me of the transition metal hydroxide precursor and a lithium compound was 1.0 or 1.1, and firing was performed at 900° C.

Table 2 below shows results of a charge-discharge test of nonaqueous electrolyte secondary batteries using the lithium transition metal composite oxides according to the above Examples and Comparative Examples for the positive active materials.

TABLE 2

| | Transition metal composition Ni/Co/Mn [mol %] | Li/Me ratio [Molar ratio] | Firing temperature ° C. | pH of reaction tank | Crystal phase of precursor | $I_{11}I_{19}$ | TAP density [g/cm 3] | Pressed density [g/cm 3] | FWHM (104) [°] | Discharge capacity during charge at 4.35 V [m Ah/g] | Amount of charge between 4.35 V and 4.6 V [m Ah/g] |
|---|---|---|---|---|---|---|---|---|---|---|---|
| Example 8 | 40/5/55 | 1.1 | 800 | 9.8 | $\alpha Me(OH)_2 + \beta Me(OH)_2$ | 0.44 | 1.88 | 2.80 | 0.524 | 148 | 91 |
| Example 9 | 45/5/50 | 1.1 | 850 | 10.0 | $\alpha Me(OH)_2 + \beta Me(OH)_2$ | 0.05 | 1.66 | 2.88 | 0.501 | 149 | 90 |
| Example 10 | 50/5/45 | 1.2 | 900 | 10.0 | $\alpha Me(OH)_2 + \beta Me(OH)_2$ | 0.05 | 2.04 | 2.83 | 0.289 | 142 | 96 |
| Example 11 | 55/5/40 | 1.3 | 850 | 10.0 | $\alpha Me(OH)_2 + \beta Me(OH)_2$ | 0.07 | 2.02 | 2.85 | 0.238 | 141 | 118 |
| Example 12 | 45/0/55 | 1.3 | 900 | 10.0 | $\alpha Me(OH)_2 + \beta Me(OH)_2$ | 0.05 | 2.10 | 3.12 | 0.397 | 132 | 129 |
| Example 13 | 55/0/45 | 1.3 | 900 | 10.0 | $\alpha Me(OH)_2 + \beta Me(OH)_2$ | 0.07 | 1.86 | 3.13 | 0.223 | 153 | 100 |
| Example 14 | 60/0/40 | 1.3 | 900 | 10.0 | $\alpha Me(OH)_2 + \beta Me(OH)_2$ | 0.12 | 2.03 | 3.19 | 0.220 | 162 | 91 |
| Example 15 | 35/15/50 | 1.3 | 800 | 10.0 | $\alpha Me(OH)_2 + \beta Me(OH)_2$ | 0.06 | 1.71 | 2.83 | 0.421 | 140 | 152 |
| Example 16 | 40/15/45 | 1.3 | 800 | 10.0 | $\alpha Me(OH)_2 + \beta Me(OH)_2$ | 0.11 | 1.77 | 2.82 | 0.359 | 146 | 125 |
| Example 17 | 45/15/40 | 1.2 | 800 | 10.0 | $\alpha Me(OH)_2 + \beta Me(OH)_2$ | 0.08 | 1.80 | 2.82 | 0.334 | 160 | 110 |
| Example 18 | 45/15/40 | 1.3 | 800 | 10.0 | $\alpha Me(OH)_2 + \beta Me(OH)_2$ | 0.08 | 1.78 | 2.88 | 0.280 | 140 | 147 |
| Example 19 | 45/15/40 | 1.2 | 850 | 10.0 | $\alpha Me(OH)_2 + \beta Me(OH)_2$ | 0.08 | 1.70 | 2.83 | 0.277 | 159 | 106 |
| Example 20 | 45/15/40 | 1.2 | 900 | 10.0 | $\alpha Me(OH)_2 + \beta Me(OH)_2$ | 0.08 | 1.70 | 2.83 | 0.236 | 164 | 100 |
| Example 21 | 35/25/40 | 1.2 | 850 | 10.0 | $\alpha Me(OH)_2 + \beta Me(OH)_2$ | 0.11 | 2.05 | 3.13 | 0.333 | 156 | 107 |
| Example 22 | 25/35/40 | 1.2 | 900 | 10.0 | $\alpha Me(OH)_2 + \beta Me(OH)_2$ | 0.04 | 1.90 | 3.17 | 0.282 | 151 | 108 |
| Example 23 | 40/5/55 | 1.2 | 800 | 9.8 | $\alpha Me(OH)_2 + \beta Me(OH)_2$ | 0.44 | 1.86 | 2.84 | 0.541 | 132 | 118 |
| Comparative Example 10 | 30/10/60 | 1.3 | 800 | 9.6 | $\alpha Me(OH)_2 + \beta Me(OH)_2$ | 0.08 | 2.12 | 2.96 | 0.467 | 111 | 169 |
| Comparative Example 11 | 30/10/60 | 1.3 | 650 | 9.6 | $\alpha Me(OH)_2 + \beta Me(OH)_2$ | 0.08 | 2.26 | 2.87 | 0.737 | 102 | 134 |
| Comparative Example 12 | 30/10/60 | 1.3 | 650 | 11.0 | $\beta Me(OH)_2$ | 0.01 | 0.94 | 2.24 | 0.667 | 126 | 152 |
| Comparative Example 13 | 30/10/60 | 1.3 | 800 | 11.0 | $\beta Me(OH)_2$ | 0.01 | 1.01 | 2.40 | 0.369 | 127 | 158 |
| Comparative Example 14 | 30/15/55 | 1.0 | 800 | 9.8 | $\alpha Me(OH)_2 + \beta Me(OH)_2$ | 0.32 | 1.83 | 2.83 | 0.502 | 86 | 139 |
| Comparative Example 15 | 33/33/33 | 1.0 | 900 | 10.0 | $\alpha Me(OH)_2 + \beta Me(OH)_2$ | 0.08 | 2.38 | 3.13 | 0.157 | 172 | 22 |
| Comparative Example 16 | 33/33/33 | 1.1 | 900 | 10.0 | $\alpha Me(OH)_2 + \beta Me(OH)_2$ | 0.08 | 2.26 | 3.21 | 0.158 | 165 | 54 |

According to Examples 8 to 23, the composition of the transition metal hydroxide precursor is adjusted such that the molar ratio Mn/Me is 0.4≤Mn/Me<0.6, and in the production of the transition metal hydroxide precursor, the hydroxide precursor containing $\alpha Mn(OH)_2$ and $\beta Mn(OH)_2$ is produced by setting the pH of the reaction tank to 10.2 or less, the precursor and the lithium compound are mixed such that the molar ratio Li/Me of Li to Me exceeds 1, and the lithium transition metal composite oxide obtained by firing at a temperature of 1000° C. or lower has a pressed density of 2.7 g/cm$^3$ or more and a FWHM (104) in the range of 0.2 to 0.6°. It is found that a battery using this lithium transition metal composite oxide as the positive active material has a large "discharge capacity during charge at 4.35 V" and a large "amount of charge between 4.35 V and 4.6 V".

In the lithium transition metal composite oxides according to Comparative Examples 10 to 13, the molar ratio Mn/Me of the transition metal hydroxide precursor is 0.6 or more. It is found that although a battery using this lithium transition metal composite oxide as the positive active material has a large "amount of charge between 4.35 V and 4.6 V", a large "discharge capacity during charge at 4.35 V" cannot be obtained.

In addition, in the lithium transition metal composite oxides according to Comparative Examples 11 and 12, the firing temperature of the transition metal hydroxide precursor and the lithium compound is as low as 650° C., and the FWHM (104) exceeds 0.6°, so that this shows that crystallization is not sufficient. In addition, in Comparative Example 12, the pH of the reaction tank is as high as 11.0, a precursor of βMe(OH)$_2$ single phase is produced, and the pressed density of the active material is low.

The lithium transition metal composite oxide according to Comparative Example 13 differs from Comparative Example 12 only in that the firing temperature of the transition metal hydroxide precursor and the lithium compound is 800° C., and the FWHM (104) satisfies 0.2 to 0.6°. However, Comparative Example 13 is similar to Comparative Example 12 in that the pH of the reaction tank is as high as 11.0 and a precursor of a β-type single phase is produced, and the pressed density of the active material is low.

In batteries using the lithium transition metal composite oxides according to Comparative Examples 10 to 13 as the positive active materials, it is found that a large "discharge capacity during charge at 4.35 V" cannot be obtained.

In the lithium transition metal composite oxide according to Comparative Example 14, although the molar ratio Mn/Me satisfies the composition range of the present invention, the composition range of the present invention is not satisfied in that the molar ratio Li/Me is 1.0 (the composition is not of a lithium excess type). It is found that the "discharge capacity during charge at 4.35 V" is extremely small despite the same production conditions as in Example 1.

The lithium transition metal composite oxide according to Comparative Example 15 is an example of a LiMeO$_2$-type active material in which Ni:Co:Mn is 1:1:1 and Li/Me is 1.0. The LiMeO$_2$-type active material is different from the lithium excess type active material, and even when initial charge is performed up to a potential of 5.0 V (vs. Li/Li$^+$), the region where the potential change relative to the amount of charge is relatively flat is not observed in a potential range of 4.5 to 5.0 V (vs. Li/Li$^+$), and the "amount of charge between 4.35 V and 4.6 V" is small.

The lithium transition metal composite oxide according to Comparative Example 16 is an example of an active material in which, although Li/Me is 1.1, Mn/Me is less than 0.4 and is 0.33. Also in the active material according to Comparative Example 16, even when initial charge is performed up to a potential of 5.0 V (vs. Li/Li$^+$), the region where the potential change relative to the amount of charge is relatively flat is not observed in the potential range of 4.5 to 5.0 V (vs. Li/Li$^+$), and the "amount of charge between 4.35 V and 4.6 V" is small.

Accordingly, in the batteries according to Comparative Examples 15 and 16, it is found that when the current is further forcibly applied beyond a full charge state (SOC 100%), SOC up to observation of a sharp increase in battery voltage cannot be sufficiently increased.

Next, the effect of the molar ratio Mn/Me on the "discharge capacity during charge at 4.35 V" will be considered.

In Comparative Examples 10 to 13 in which the molar ratio Mn/Me is 0.6, as described above, the "discharge capacity during charge at 4.35 V" is as small as less than 130 mAh/g. On the other hand, in Examples 1 to 23 in which the molar ratio Mn/Me is less than 0.6, the "discharge capacity during charge at 4.35 V" is as excellent as 130 mAh/g or more. Among Examples, in Examples 9 to 11 and 13 to 22 in which the molar ratio Mn/Me is 0.50 or less, the "discharge capacity during charge at 4.35 V" is as more excellent as 140 mAh/g or more.

According to the knowledge of the present inventor, when the molar ratio Li/Me is 1.1, a large "discharge capacity during charge at 4.35 V" may be obtained depending on the composition. However, in order to also have a large "amount of charge between 4.35 V and 4.6 V", the molar ratio Li/Me is preferably 1.15 or more. For example, in comparing Examples 8 and 23 in which the conditions of a compositional ratio of Ni:Co:Mn, the reaction pH, and the firing temperature are all the same except that the molar ratio Li/Me is different, it is found that in Example 23 in which the molar ratio Li/Me is 1.2, the "amount of charge between 4.35 V and 4.6 V" is significantly improved as compared with Example 8 in which the molar ratio Li/Me is 1.1.

<Confirmation of Crystal Structure of Electrode After Charge-Discharge Test>

Among the nonaqueous electrolyte secondary batteries after the charge-discharge test, in Examples 1, 6, 8, and 16, disassembly of the batteries and the X-ray diffraction measurement of the positive composite were performed by the above procedure.

In the secondary battery to which the initial charge-discharge condition 1 was applied, a superlattice peak was observed. On the other hand, in the secondary battery to which the initial charge-discharge condition 2 was applied, no superlattice peak was observed.

INDUSTRIAL APPLICABILITY

By using the positive active material containing the lithium transition metal composite oxide according to the present invention, it is possible to provide a nonaqueous electrolyte secondary battery which has a large discharge capacity even when charged at a relatively low voltage and in which safety is further improved. Accordingly, this nonaqueous electrolyte secondary battery is useful as a nonaqueous electrolyte secondary battery for hybrid vehicles, electric vehicles, plug-in hybrid vehicles, and the like.

DESCRIPTION OF REFERENCE SIGNS 1A, 1B: Measurement probe
2A, 2B: Measurement surface
3A, 3B: Pedestal
6: Lateral body
7: Through-hole
1: Nonaqueous electrolyte secondary battery
2: Electrode group
3: Battery case
4: Positive electrode terminal
4': Positive electrode lead
5: Negative electrode terminal
5': Negative electrode lead
20: Energy storage unit
30: Energy storage apparatus

The invention claimed is:

1. A positive active material for a nonaqueous electrolyte secondary battery containing a lithium transition metal composite oxide, wherein
the lithium transition metal composite oxide has an α-NaFeO$_2$ structure,
a molar ratio Li/Me of Li and a transition metal (Me) is 1<Li/Me,
Ni and Mn, or Ni, Co, and Mn are included as the transition metals (Me), a molar ratio Mn/Me of Mn and Me is 0.4≤Mn/Me<0.6,
when the lithium transition metal composite oxide is pressed at a pressure of 40 MPa, a density is 2.7 g/cm$^3$ or more, and the lithium transition metal composite oxide has an X-ray diffraction pattern attributable to R3-m, and has an X-ray diffraction pattern which has a half-value width for a diffraction peak of a (104) plane at a Miller index hkl in X-ray diffraction measurement using a CuKα ray of 0.2° or more and 0.6° or less or has an X-ray diffraction pattern attributable to $P3_112$, and has an X-ray diffraction pattern which has a half-value width for a diffraction peak of a (114) plane at the Miller index hkl in the X-ray diffraction measurement using the CuKα ray of 0.2° or more and 0.6° or less.

2. A positive electrode for a nonaqueous electrolyte secondary battery containing the positive active material according to claim 1.

3. A nonaqueous electrolyte secondary battery comprising the positive electrode for a nonaqueous electrolyte secondary battery according to claim 2.

4. A method of producing the positive active material of claim 1 for a nonaqueous electrolyte secondary battery containing a lithium transition metal composite oxide, the production method comprising:

mixing a lithium compound with a transition metal hydroxide precursor; and firing at 750 to 1000° C. to produce a lithium transition metal composite oxide, wherein the transition metal hydroxide precursor comprises Ni and Mn, or Ni, Co, and Mn as transition metals (Me), a molar ratio Mn/Me of Mn and Me is 0.4≤Mn/Me<0.6, and the transition metal hydroxide precursor contains αMe(OH)$_2$ and βMe(OH)$_2$.

\* \* \* \* \*